(12) United States Patent
Chambers et al.

(10) Patent No.: US 12,291,297 B2
(45) Date of Patent: May 6, 2025

(54) HEIGHT ADJUSTABLE SEAT POSTS FOR BICYCLES

(71) Applicant: SRAM, LLC, Chicago, IL (US)

(72) Inventors: Rafer Chambers, Colorado Springs, CO (US); Christopher Eric Golkiewicz, Colorado Springs, CO (US); Chi Hui Su, Taichung (TW); Donald Frederick Coffman, Colorado Springs, CO (US); Alex Kyle McGee, Colorado Springs, CO (US); Charles Dunlap, Manitou Springs, CO (US)

(73) Assignee: SRAM, LLC, Chicago, IL (US)

( * ) Notice: Subject to any disclaimer, the term of this patent is extended or adjusted under 35 U.S.C. 154(b) by 71 days.

(21) Appl. No.: 18/169,512

(22) Filed: Feb. 15, 2023

(65) Prior Publication Data

US 2024/0166286 A1 May 23, 2024

Related U.S. Application Data

(63) Continuation-in-part of application No. 17/991,205, filed on Nov. 21, 2022.

(51) Int. Cl.
*B62M 9/124* (2010.01)
*B62J 1/08* (2006.01)
*B62K 23/00* (2006.01)

(52) U.S. Cl.
CPC ............ *B62J 1/08* (2013.01); *B62J 2001/085* (2013.01)

(58) Field of Classification Search
CPC ........... B62J 2001/085; B62J 1/08; B62J 1/10
See application file for complete search history.

(56) References Cited

U.S. PATENT DOCUMENTS

| 8,016,349 B2 | 9/2011 | Shimano |
| 8,091,910 B2 | 1/2012 | Shimano |

(Continued)

FOREIGN PATENT DOCUMENTS

| CN | 201320667836 | 5/2014 |
| CN | 204489030 U | 7/2015 |

(Continued)

OTHER PUBLICATIONS

Overholt, Zack; Taipei Cycle Show: KS Hints Towards the Future of Electronic Dropper Posts; Website: https://bikerumor.com/taipei-cycle-show-ks-hints-towards-the-future-of-electronic-dropper-posts/, last checked Feb. 1, 2023.

(Continued)

*Primary Examiner* — Shin H Kim

(57) ABSTRACT

Height adjustable seat posts for bicycles are described herein. An example height adjustable seat post includes an upper tube and a lower tube configured in a telescopic arrangement. The height adjustable seat post also includes a shaft coupled to the lower tube and extending into the upper tube a piston assembly coupled to the shaft and disposed in the upper tube. The piston assembly includes a piston dividing the upper tube into a first chamber and a second chamber. The first and second chambers are filled with fluid. The piston assembly includes a valve operable between a closed state in which the fluid is blocked from flowing between the first and second chambers and an open state to enable the fluid to flow between the first and second chambers. The height adjustable seat post also includes a solenoid to control the valve.

19 Claims, 21 Drawing Sheets

(56) References Cited

U.S. PATENT DOCUMENTS

| | | |
|---|---|---|
| 8,246,065 B1 | 8/2012 | Shimano |
| 8,308,124 B2 | 11/2012 | Hsu |
| 8,317,261 B2 * | 11/2012 | Walsh .................. B62J 1/08 |
| | | 297/215.13 |
| 8,328,454 B2 | 12/2012 | McAndrews et al. |
| 8,814,109 B2 | 8/2014 | Laird et al. |
| 8,833,786 B2 | 9/2014 | Camp et al. |
| 8,833,848 B2 | 9/2014 | Shirai |
| 9,272,745 B2 | 3/2016 | Camp et al. |
| 9,422,018 B2 | 8/2016 | Pelot et al. |
| 9,499,224 B2 | 11/2016 | Shirai |
| 9,511,809 B2 | 12/2016 | Kodama et al. |
| 9,540,063 B1 * | 1/2017 | Shirai .................. B62J 1/08 |
| 9,840,294 B2 | 12/2017 | Hara |
| 10,040,499 B2 | 8/2018 | Hara et al. |
| 10,137,964 B2 | 11/2018 | Kurokawa et al. |
| 10,322,762 B2 | 6/2019 | Shirai |
| 10,336,400 B2 | 7/2019 | Hara |
| 10,358,180 B2 | 7/2019 | Shipman et al. |
| 10,392,020 B2 | 8/2019 | Komatsu et al. |
| 10,472,013 B2 | 11/2019 | Pelot et al. |
| 10,513,300 B2 * | 12/2019 | Bowers .................. B62K 3/02 |
| 10,549,803 B2 | 2/2020 | Shipman et al. |
| 10,604,201 B2 | 3/2020 | Shirai et al. |
| 10,611,433 B2 | 4/2020 | Chambers |
| 10,618,589 B2 | 4/2020 | Hara et al. |
| 10,676,146 B2 | 6/2020 | Hara et al. |
| 10,710,662 B2 | 7/2020 | Bowers et al. |
| 10,737,546 B2 | 8/2020 | Tong |
| 10,752,307 B2 | 8/2020 | Eberlberger |
| 10,759,483 B2 | 9/2020 | Hara et al. |
| 10,787,215 B1 | 9/2020 | Staples |
| 10,807,667 B2 | 10/2020 | Shipman et al. |
| 10,807,670 B2 | 10/2020 | Krugman et al. |
| 10,829,173 B2 | 11/2020 | Hara et al. |
| 10,843,757 B2 | 11/2020 | Komatsu et al. |
| 10,953,950 B2 | 3/2021 | Komatsu et al. |
| 10,988,198 B2 | 4/2021 | Komatsu et al. |
| 10,988,205 B2 | 4/2021 | Tsuchizawa et al. |
| 11,001,323 B2 | 5/2021 | Kurokawa |
| 11,066,118 B2 | 7/2021 | Katsuki et al. |
| 11,066,126 B2 | 7/2021 | Kurokawa et al. |
| 11,104,395 B2 | 8/2021 | Staples |
| 11,136,083 B2 | 10/2021 | Shirai |
| 11,161,565 B2 | 11/2021 | Kurotobi et al. |
| 11,180,211 B2 * | 11/2021 | Hara .................. B62J 43/30 |
| 11,518,477 B2 * | 12/2022 | Shirai .................. B62M 25/08 |
| 11,649,002 B2 * | 5/2023 | Shipman .................. B62J 1/08 |
| | | 297/215.13 |
| 11,964,722 B2 * | 4/2024 | Staples .................. B62J 1/08 |
| 2006/0175792 A1 * | 8/2006 | Sicz .................. B62J 1/08 |
| | | 280/200 |
| 2017/0282986 A1 | 10/2017 | Jhou |
| 2018/0186419 A1 * | 7/2018 | Shipman .................. B62K 19/36 |
| 2019/0061851 A1 | 2/2019 | Kurokawa |
| 2019/0092116 A1 | 3/2019 | Magnus et al. |
| 2019/0193800 A1 * | 6/2019 | Hara .................. B62J 45/41 |
| 2019/0351966 A1 * | 11/2019 | Shirai .................. B62J 1/08 |
| 2020/0023918 A1 * | 1/2020 | Shirai .................. B62J 1/08 |
| 2020/0140029 A1 | 5/2020 | Shipman et al. |
| 2020/0148300 A1 | 5/2020 | Komatsu et al. |
| 2020/0317283 A1 | 10/2020 | Staples |
| 2020/0377176 A1 | 12/2020 | Shirai et al. |
| 2021/0001941 A1 | 1/2021 | Shipman et al. |
| 2021/0024154 A1 | 1/2021 | Hara et al. |
| 2021/0031851 A1 | 2/2021 | Watson |
| 2021/0107581 A1 | 4/2021 | Hara et al. |
| 2021/0107588 A1 | 4/2021 | Sakagawa et al. |
| 2021/0206443 A1 | 7/2021 | Sakagawa et al. |
| 2021/0403111 A1 | 12/2021 | Chambers et al. |
| 2022/0041237 A1 | 2/2022 | Tso et al. |
| 2022/0106005 A1 | 4/2022 | Shirai et al. |
| 2023/0021733 A1 * | 1/2023 | Endo .................. H02J 50/10 |
| 2023/0211845 A1 * | 7/2023 | Shipman .................. B62J 1/08 |
| | | 297/215.13 |
| 2023/0234661 A1 * | 7/2023 | Holaday .................. B62J 1/08 |
| | | 297/215.13 |

FOREIGN PATENT DOCUMENTS

| | | |
|---|---|---|
| CN | 107685824 B2 | 9/2020 |
| DE | 102016010845 | 4/2017 |
| DE | 102016010857 | 4/2017 |
| DE | 102018102783 A1 | 9/2018 |
| DE | 102018119985 A1 | 2/2019 |
| DE | 102021123822 A1 | 4/2022 |
| EP | 2457811 | 5/2012 |
| EP | 2657113 | 10/2014 |
| EP | 2865586 | 4/2015 |
| EP | 2886428 | 6/2015 |
| TW | M378163 U | 4/2010 |
| TW | 201217209 | 5/2012 |
| TW | I562922 | 12/2016 |
| TW | I671226 | 9/2019 |
| TW | 202003306 | 1/2020 |

OTHER PUBLICATIONS

Levy, Mike; First Look: KS Electronic Wireless Dropper Post—Taipei Show 2014; https://www.pinkbike.com/news/ks-electronic-wireless-dropper-post-first-look.html, last checked Feb. 1, 2023.

* cited by examiner

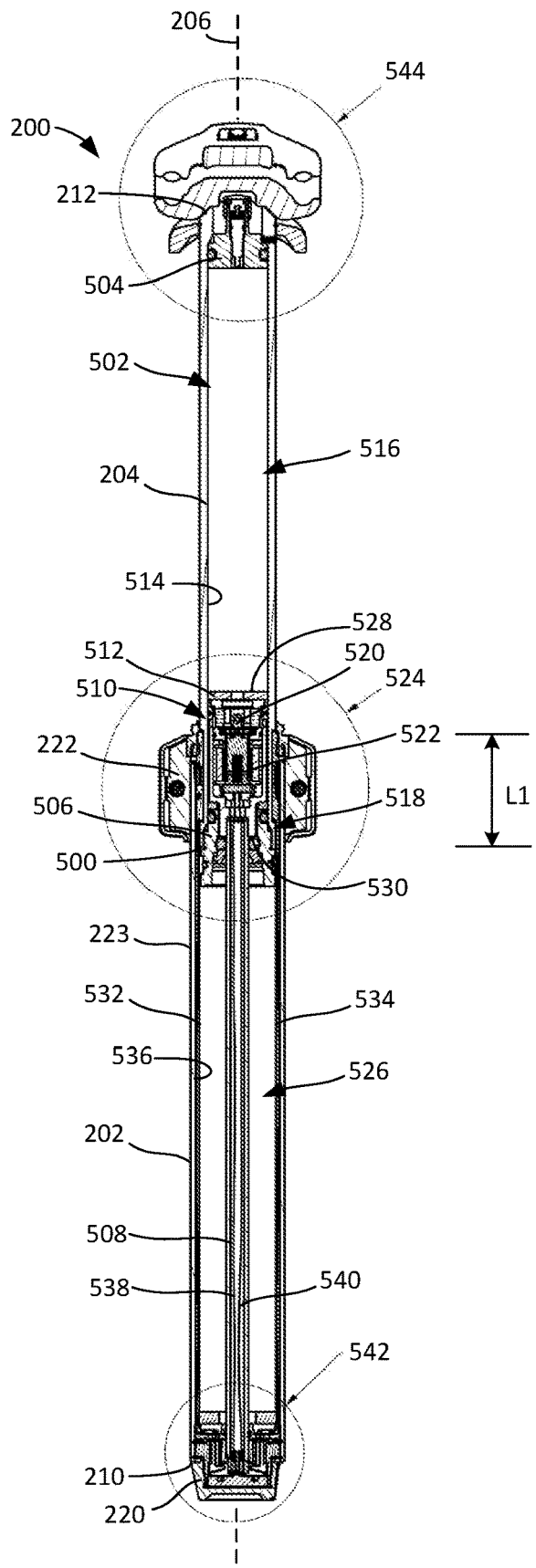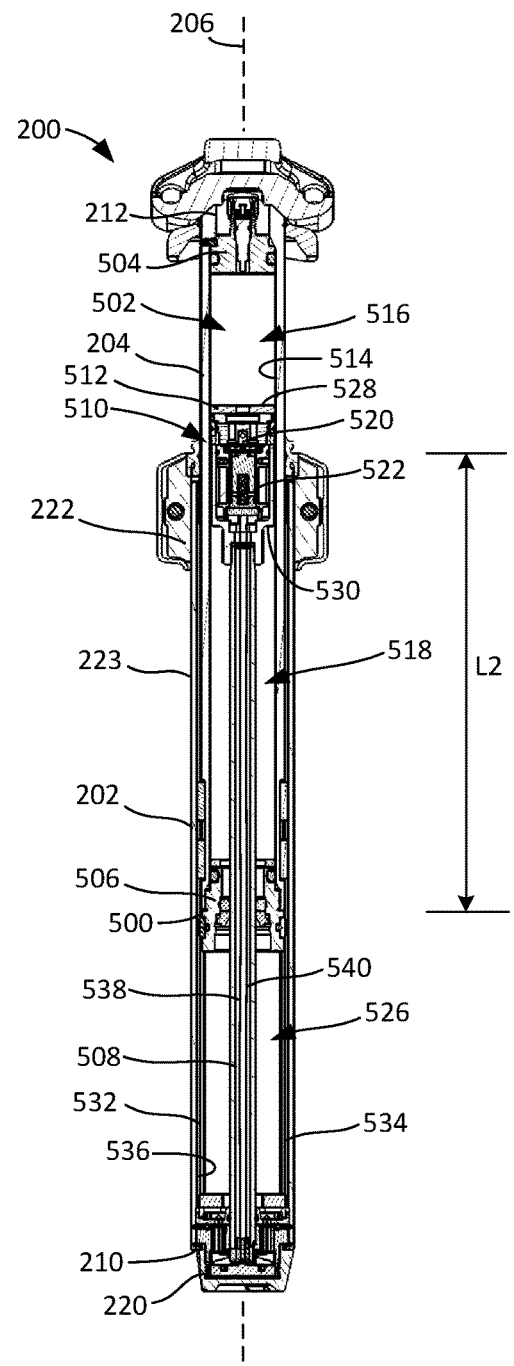
FIG. 5
FIG. 6

HEIGHT ADJUSTABLE SEAT POSTS FOR BICYCLES

This application is a continuation-in-part of U.S. patent application Ser. No. 17/991,205, filed Nov. 21, 2022, which is hereby incorporated by reference in its entirety.

FIELD OF THE DISCLOSURE

This disclosure relates generally to bicycle components and, more specifically, to height adjustable seat posts for bicycles.

BACKGROUND

Bicycles are known to have a seat or saddle to support a rider in a seated position. The seat is typically connected to the bicycle frame by a seat post. On most bicycles, the seat post can be manually adjusted to raise or lower the height of the seat to accommodate different riders of different heights. The height may also be adjusted to accommodate different riding conditions. Typically, the seat post is mechanically clamped to a tube of the bicycle frame. When the clamp is released, the seat and post are slidable up and down relative to the tube of the bicycle frame to adjust the height of the seat. On some recent higher end bicycles, the seat post is height adjustable during riding of the bicycle by employing some type of hydraulic assist mechanism. For example, manually actuated hydraulic height adjustable or "dropper" seat posts may use a hydraulic pressure differential within the post and require manual operation to adjust the seat post height. Some products may use ANT+ wireless communication technology allowing the rider to wirelessly adjust the seat height.

SUMMARY

An example height adjustable seat post for a bicycle disclosed herein includes an upper tube and a lower tube configured in a telescopic arrangement. The lower tube is to be coupled to a frame of the bicycle, and the upper tube is to be coupled to a seat. The height adjustable seat post also includes a shaft coupled to the lower tube and extending into the upper tube a piston assembly coupled to the shaft and disposed in the upper tube. The piston assembly includes a piston dividing the upper tube into a first chamber and a second chamber. The first and second chambers are filled with fluid. A valve operable between a closed state in which the fluid is blocked from flowing between the first and second chambers and an open state to enable the fluid to flow between the first and second chambers. The height adjustable seat post also includes a solenoid to control the valve.

An example height adjustable seat post for a bicycle disclosed herein includes an upper tube and a lower tube configured in a telescopic arrangement. The lower tube is to be coupled to a frame of the bicycle, and the upper tube is to be coupled to a seat. The height adjustable seat post includes an end cap coupled to a lower end of the lower tube, a shaft coupled to the lower tube and extending into the upper tube, and a piston assembly coupled to the shaft and disposed in the upper tube. The piston assembly divides the upper tube into a first chamber and a second chamber. The piston assembly includes a solenoid. The height adjustable seat post also includes a control module to activate the solenoid. Inner wires are disposed in the shaft and extend between the end cap and the solenoid. One or more electrical connectors in the end cap to electrically couple the inner wires to the control module.

BRIEF DESCRIPTION OF THE DRAWINGS

FIG. 5 is a cross-sectional view of the example height adjustable seat post of FIG. 2 in the fully extended position.

FIG. 6 is a cross-sectional view of the example height adjustable seat post of FIG. 2 in the partially contracted position.

FIG. 12 shows the example pilot valve in a closed state.

FIG. 13 shows the example pilot valve in the closed state.

FIG. 20 shows the example face valve in a closed state.

FIG. 21 shows the example face valve in the closed state.

FIG. 25 shows the example spool valve in a closed state.

FIG. 28 shows the example pull valve in a closed state.

FIG. 30 shows the example push valve in a closed state.

FIG. 32 shows the example height adjustable seat post in a fully extended position.

FIG. 35 shows the example push rod valve in a closed state.

The figures are not to scale. Instead, the thickness of the layers or regions may be enlarged in the drawings. In general, the same reference numbers will be used throughout the drawing(s) and accompanying written description to refer to the same or like parts.

Figure 1:
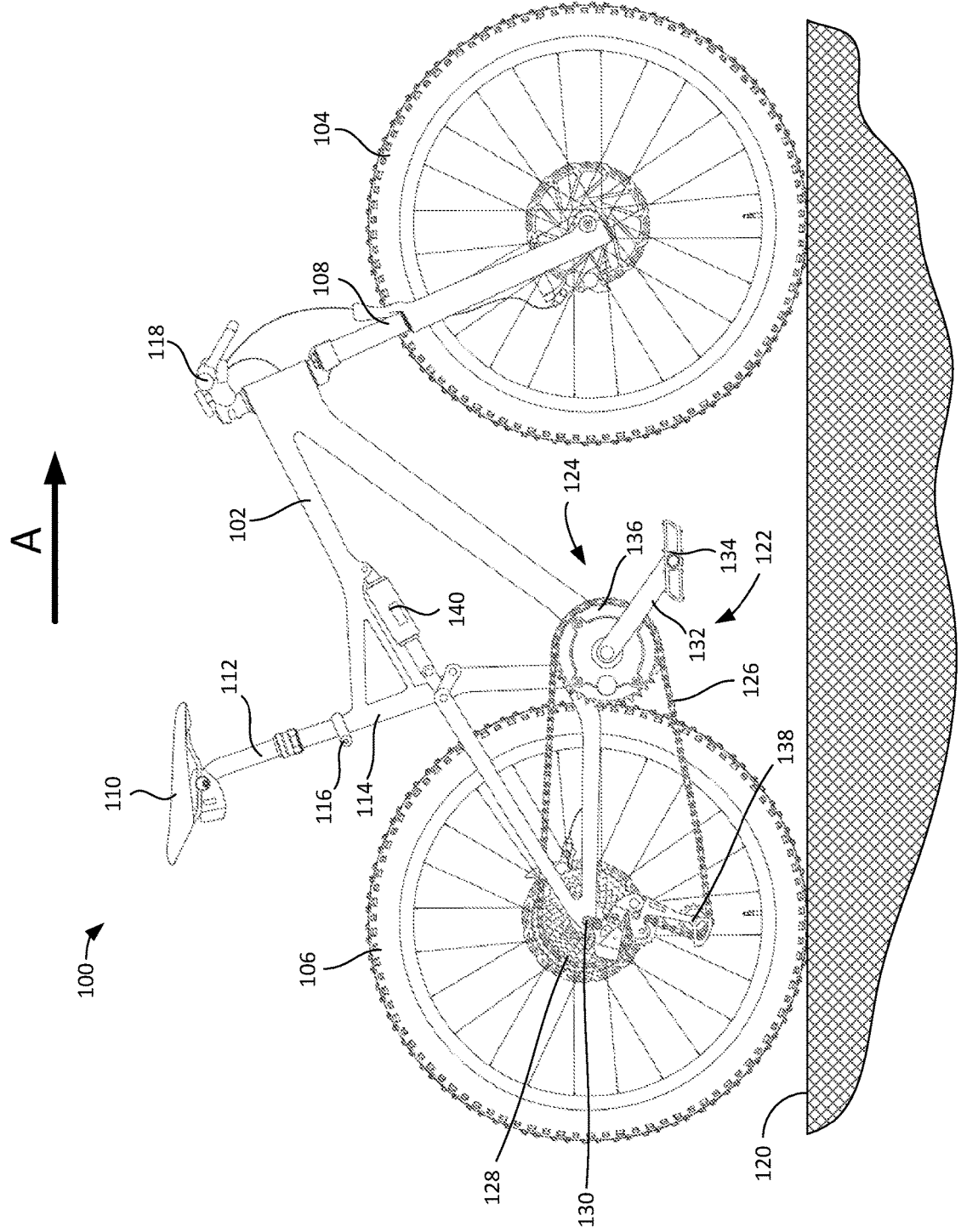
FIG. 1 is a side view of an example bicycle that may employ any of the example height adjustable seat posts disclosed herein.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Some modern bicycles include a height adjustable seat post, sometimes referred to as dropper seat post, that allows a rider to change the height of their seat while riding the bicycle. For example, the rider can press an actuation button on the handlebars and push downward on the seat (e.g., with their bottom), which contracts or compresses the seat post and thereby lowers the height of the seat. When the rider releases the actuation button, the seat post is maintained in the contracted position. Then, when the rider desires to raise the seat, the rider can press the actuation button again and the seat post extends or expands to move the seat back to the original height. This lowering ability can be advantageous when the rider is about to ride the bicycle down a steep decline. For instance, it is often desired to lower the seat when riding down a decline so that the rider can stand up and lean backward without the seat hitting their bottom. This lowering ability can also be used to lower the seat before the rider encounters an incline, where the rider typically stands up and peddles. Adjustable seat posts can be used in other scenarios as well.

Known dropper seat posts rely on hydraulic fluid and/or pneumatic pressure controlled by a mechanically or hydraulically actuated valve to change height. More recently, dropper seat posts have used battery powered motors controlled by an electrical signal to actuate the valve. These motor systems require complex gear systems to create the linear motion to actuate the valve. These motor systems also require motor position encoders and monitoring systems to ensure proper valve actuation. Thus, these known motor systems are typically complex to manufacture and can be relatively expensive.

Disclosed herein are height adjustable seats posts that utilize an electric solenoid to directly actuate the valve to enable the seat post to expand or contract. In particular, the solenoid can be activated to open the valve and enable the seat post to expand or contract or can be deactivated to close the valve and lock the seat post in a certain position (corresponding to a certain seat height). The example solenoid-operated valves disclosed herein are advantageous because they do not require position monitoring as seen in known dropper seat posts. This greatly reduces manufacturing complexity and costs. Further the example solenoids disclosed herein only make small, linear movements. This reduces the space needed to incorporate the actuation components in the seat post.

An example height adjustable seat post disclosed herein includes an upper tube and a lower tube that are configured in a telescopic arrangement. The lower tube is coupled or mounted to the bicycle frame, and the seat is coupled to the upper tube. The upper tube can slide relative to the lower tube to adjust the height of the seat. The upper tube is sealed on both ends and forms a pneumatic chamber filled with a pressurized gas (e.g., air, nitrogen). The seat post includes a shaft coupled to the lower tube and extending into the upper tube. The seat post includes a piston assembly disposed in the upper tube and coupled to the shaft. The piston assembly includes a piston that divides the pneumatic chamber into an upper pneumatic chamber and a lower pneumatic chamber. The piston assembly is generally located in a region of overlap between the upper and lower tubes. The piston assembly includes a valve that controls the flow of gas between the upper and lower pneumatic chambers. Various example valves are disclosed herein, including a pilot valve, a face valve, a spool valve, a pull valve, and a push valve. The seat post also includes a solenoid to operate the valve between a closed state and an open state. When the valve is closed, the valve blocks or prevents gas flow between the two chambers. The pressure in the upper pneumatic chamber is sufficient to support the weight of the rider. When it is desired to raise or lower the seat, the solenoid is activated to open the valve. When the valve is opened, gas can flow across the piston between the upper and lower pneumatic chambers. This enables the rider to move the upper tube upward or downward relative to the lower tube, thereby raising or lowering the height of the seat. When a desired seat position is reached, the solenoid is deactivated and the valve is switched back to the closed state, which locks the seat post in its current position.

In some examples disclosed herein, the solenoid is disposed in the piston in the upper tube. As such, the solenoid is disposed in the region of overlap between the upper tube and the lower tube. In some examples, the seat post includes a control module with a power supply (e.g., a battery) to operate (e.g., activate or deactivate) the solenoid. In some examples, the control module with the power supply is coupled to an outer surface of the lower tube, such as at or near the collar at the upper end of the lower tube. In some examples disclosed herein, the seat post includes a network for wires and/or electrical connectors that electrically connect the control module, which is disposed outside of the tubes, to the solenoid, which is disposed inside of the tubes.

Also disclosed herein are configurations where the solenoid is coupled to a lower end of the lower tube. In such examples, the seat post includes a push rod extending through the shaft between the solenoid and the valve in the piston assembly. The solenoid can be activated to move the push rod and control the state of valve. In some instances, this position of the solenoid is advantageous because it enables the solenoid to be physically larger (e.g., with a larger diameter), which reduces power consumption by the solenoid.

The example solenoid operated valves also utilize relatively low energy compared to known dropper seat posts. In some examples, the solenoid is activated using a first electrical current, and then once the valve is opened, the electrical current can be reduced to a second (lower) electrical current to hold the valve in the open state. This reduces the amount of power consumed by the solenoid, and also enables a smaller capacity control module.

Turning now to the figures, FIG. 1 illustrates one example of a human powered vehicle on which the example seat posts disclosed herein can be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. A front and/or forward riding direction or orientation of the bicycle 100 is indicated by the direction of the arrow A in FIG. 1. As such, a forward direction of movement for the bicycle 100 is indicated by the direction of arrow A.

In the illustrated example of FIG. 1, the bicycle 100 includes a seat 110 (sometimes referred to as a saddle) coupled to the frame 102 (e.g., near the rear end of the frame 102 relative to the forward direction A) via a seat post 112. In particular, the seat post 112 is coupled to a seat tube 114 of the frame 102. In some examples, the seat post 112 is coupled to the seat tube 114 by a clamp 116. In some examples, the seat post 112 is height adjustable to raise or lower the seat 110. Example height adjustable seat posts are disclosed in further detail herein. The bicycle 100 also includes handlebars 118 coupled to the frame 102 and the front fork 108 (e.g., near a forward end of the frame 102 relative to the forward direction A) for steering the bicycle 100. The bicycle 100 is shown on a riding surface 120. The riding surface 120 may be any riding surface such as the ground (e.g., a dirt path, a sidewalk, a street, etc.), a man-made structure above the ground (e.g., a wooden ramp), and/or any other surface.

In the illustrated example, the bicycle 100 has a drivetrain 122 that includes a crank assembly 124. The crank assembly 124 is operatively coupled via a chain 126 to a sprocket assembly 128 mounted to a hub 130 of the rear wheel 106. The crank assembly 124 includes at least one, and typically two, crank arms 132 and pedals 134, along with at least one front sprocket, or chainring 136. A rear gear change device 138, such as a derailleur, is disposed at the rear wheel 106 to move the chain 126 between different sprockets of the sprocket assembly 128. Additionally or alternatively, the bicycle 100 may include a plurality of front chainrings and a front gear change device to move the chain 126 between the plurality of chainrings.

The example bicycle 100 can include a suspension system having one or more suspension components. In the illustrated example, the bicycle 100 includes a rear suspension component 140. In this example, the suspension component 140 is implemented as or includes a shock absorber, referred to herein as the shock absorber 140. In some examples, the front fork 108 is also implemented as a front suspension component. For example, a spring can be integrated into one of the legs and a damper can be integrated into the other leg. Therefore, the front fork 108 and the shock absorber 140 absorb shocks and vibrations while riding the bicycle 100 (e.g., when riding over rough terrain). In other examples, the front fork 108 and/or the shock absorber 140 may be integrated into the bicycle 100 in other configurations or arrangements.

While the example bicycle 100 depicted in FIG. 1 is a type of mountain bicycle, the example seat posts disclosed herein can be implemented on other types of bicycles. For example, the example seat posts disclosed herein may be used on road bicycles, as well as bicycles with mechanical (e.g., cable, hydraulic, pneumatic, etc.) and non-mechanical (e.g., wired, wireless) drive systems. The example seat posts disclosed herein may also be implemented on other types of two-wheeled, three-wheeled, and four-wheeled human powered vehicles. Further, the example seat posts disclosed herein can be used on other types of vehicles, such as motorized vehicles (e.g., a motorcycle).

Figure 2:
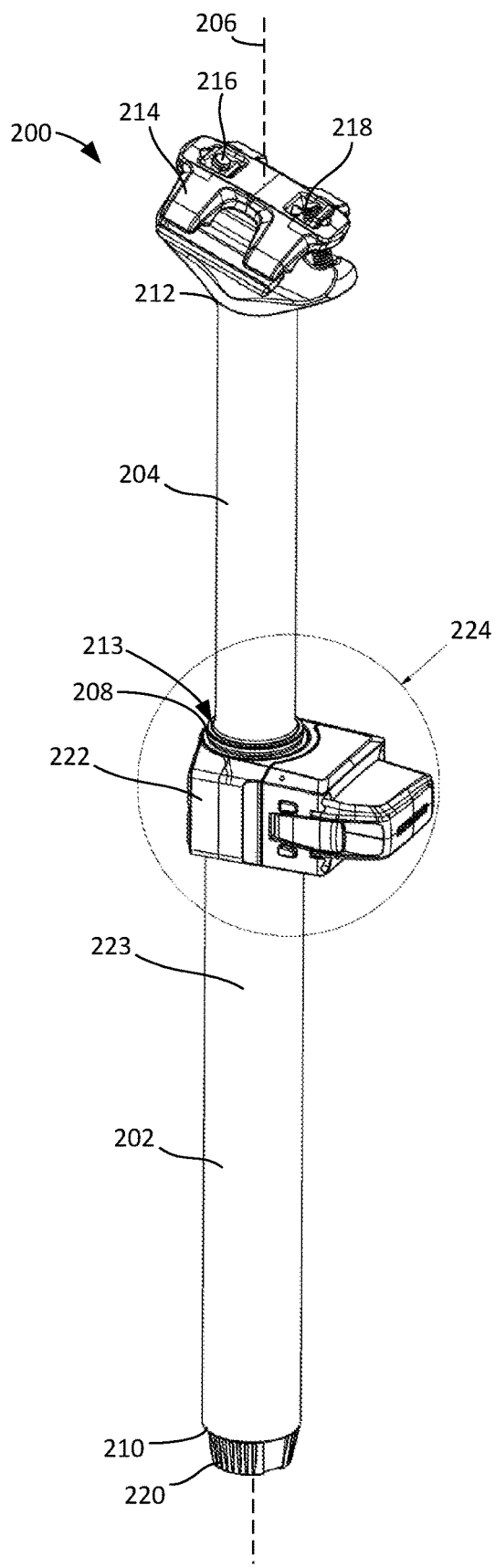
FIG. 2 is a perspective view of an example height adjustable seat post in a fully extended position.

FIG. 2 is a perspective view of an example height adjustable seat post 200 that can be implemented as the seat post 112 on the bicycle 100 of FIG. 1. The seat post 200 can also be referred to as a dropper seat post or seat post assembly. The length or height of the example seat post 200 is adjustable so that the height of the seat 110 (FIG. 1) can be raised or lowered. In the illustrated example, the seat post 200 includes a first tube 202, referred to herein as a lower tube 202, and a second tube 204, referred to herein as an upper tube 204. The lower and upper tubes 202, 204 may also be referred to as seat post portions or segments. As shown in FIG. 2, the lower and upper tubes 202, 204 are configured in a coaxial arrangement and aligned along an axis 206. The lower tube 202 has a first end 208, referred to herein as an upper end 208, and a second end 210, referred to herein as a lower end 210, opposite the upper end 208. The upper tube 204 similarly has a first end 212, referred to herein as an upper end 212, and a second end 500 (shown in FIGS. 5 and 6), referred to herein as a lower end 500, opposite the upper end 212. The upper tube 204 extends into an opening 213 in the upper end 208 of the lower tube 202. As such, the upper tube 204 is at least partially disposed in the lower tube 202. The upper tube 204 is slidable into and out of the opening 213 in the lower tube 202. Therefore, the upper tube 204 and the lower tube 202 are configured in a telescopic arrangement. In other examples the tubes 202, 204 can be configured such that the lower tube 202 extends into the lower end 500 of the upper tube 204.

In the illustrated example, the seat post 200 includes a seat clamp 214 coupled (e.g., welded, bolted, etc.) to the upper end 212 of the upper tube 204. The seat clamp 214 is used to couple the seat 110 (FIG. 1) to the seat post 200. In this example, the seat clamp 214 includes two threaded fasteners 216, 218 (e.g., bolts) that can be tightened to secure the seat 110 to the upper tube 204. In other examples, the seat post 200 can include other mechanisms for attaching to the seat 110. In the illustrated example, the seat post 200 includes an end cap 220 coupled to the lower end 210 of the lower tube 202. The end cap 220 is disclosed in further detail herein.

Figure 3:
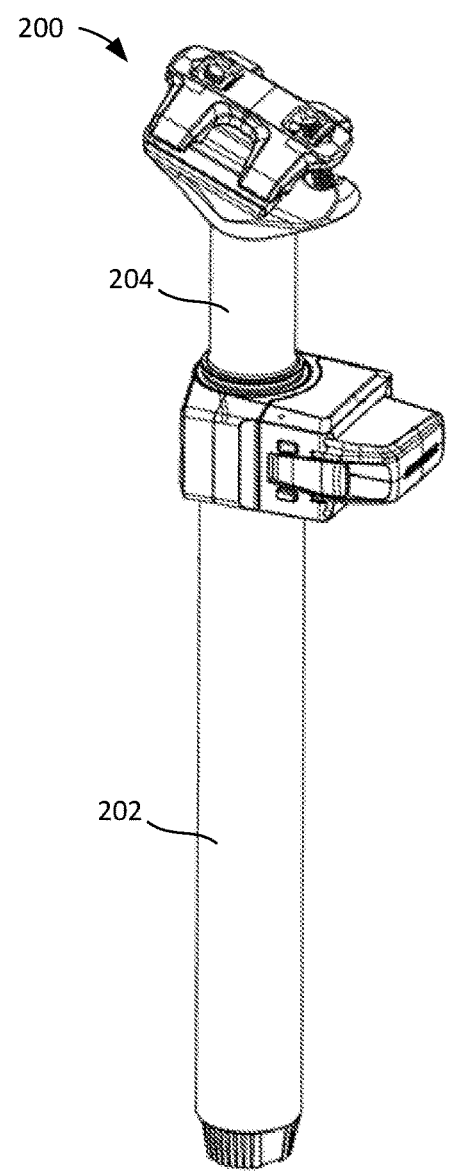
FIG. 3 is a perspective view of the example height adjustable seat post of FIG. 2 in a partially contracted position.

When the seat post 200 is installed on the bicycle 100 (FIG. 1), the lower tube 202 is coupled to the frame 102 (FIG. 1). For example, the lower tube 202 can be inserted into the seat tube 114 (FIG. 1) and secured by the clamp 116 (FIG. 1). The upper tube 204 extends upward from the lower tube 202 and supports the seat 110 (FIG. 1). As disclosed in further detail herein, the seat post 200 has an internal valve system that enables the upper tube 204 to move (e.g., slide) downward relative to the lower tube 202 and provides rebounding force to move the upper tube 204 upward relative to the lower tube 202. This enables a rider to easily lower the height the seat 110. The seat post 200 is adjustable between a fully extended position (sometimes referred to as a top-out position), shown in FIG. 2, and a fully contracted position in which the upper tube 204 is moved into the lower tube 202 until a stop or limit is reached. The seat post 200 can also be expanded/contracted to any position between the fully extended position and the fully contracted position and locked in place. For example, FIG. 3 shows an example in which the upper tube 204 has been partially moved into the lower tube 202. As such, the seat 110 (FIG. 1) would be lowered or closer to the ground.

In the illustrated example of FIG. 2, the seat post 200 includes a control module 222. The control module 222 includes a power supply (e.g., a battery) and circuitry (e.g., processor circuitry, logic circuitry, etc.) to operate the internal valve system. In this example, the control module 222 is coupled to an outer surface 223 of the lower tube 202 at or near the upper end 208 of the lower tube 202. Some known dropper posts locate the control module on the seat clamp. However, this location can interface with the rear tire clearance. Therefore, locating the control module 222 at the upper end of the lower tube 202, adjacent the overlap region, can be advantageous to improve rear wheel clearance. This location also helps maintain a minimal ratio of drop height to overall length.

As an example operation, if a rider desires to lower the seat 110 (FIG. 1), the rider presses a seat post activation button on the handlebars 118 (FIG. 1). The control module 222 receives a signal (e.g., a wireless signal) from the seat post activation button and activates the internal valve system to open an internal valve in the pneumatic chamber in the upper tube 204, as disclosed in further detail herein. While the internal valve is open, the rider can push downward on the seat 110, which slides the upper tube 204 into the lower tube 202, as shown in the position of FIG. 3. In some examples, the rider can apply this force by sitting on the seat 110 and apply the downward force with their bottom. When the seat 110 reaches the desired height, the rider can release the button on the handlebars 118. The control module 222 closes the internal valve, which locks the upper tube 204 in place relative to the lower tube 202. When the rider desires to raise the seat 110, the rider can press the seat post activation button. The control module 222 receives the signal and opens the internal valve. When little or no downward force is acting on the seat 110, the internal pneumatic system pushes the upper tube 204 upward from the lower tube 202, thereby moving the seat 110 upward. When the desired position is reached, the rider can release the seat post actuation button, which causes the internal valve to close and holds the seat post 200 in the current position.

In some examples, to activate the internal valve system, the rider pushes and holds the seat post activation button. As long as the seat post activation button is depressed, the valve is held in the open state, which enables the upper tube 204 to slide upward or downward relative to the lower tube 202. When the rider releases the seat post activation button, the interval valve is closed, which locks the upper tube 204 in place. However, in other examples, the system can be configured such that the rider may press the button and release the button to cause the valve to open, and then the rider presses the button a second time to close the valve.

Figure 4:
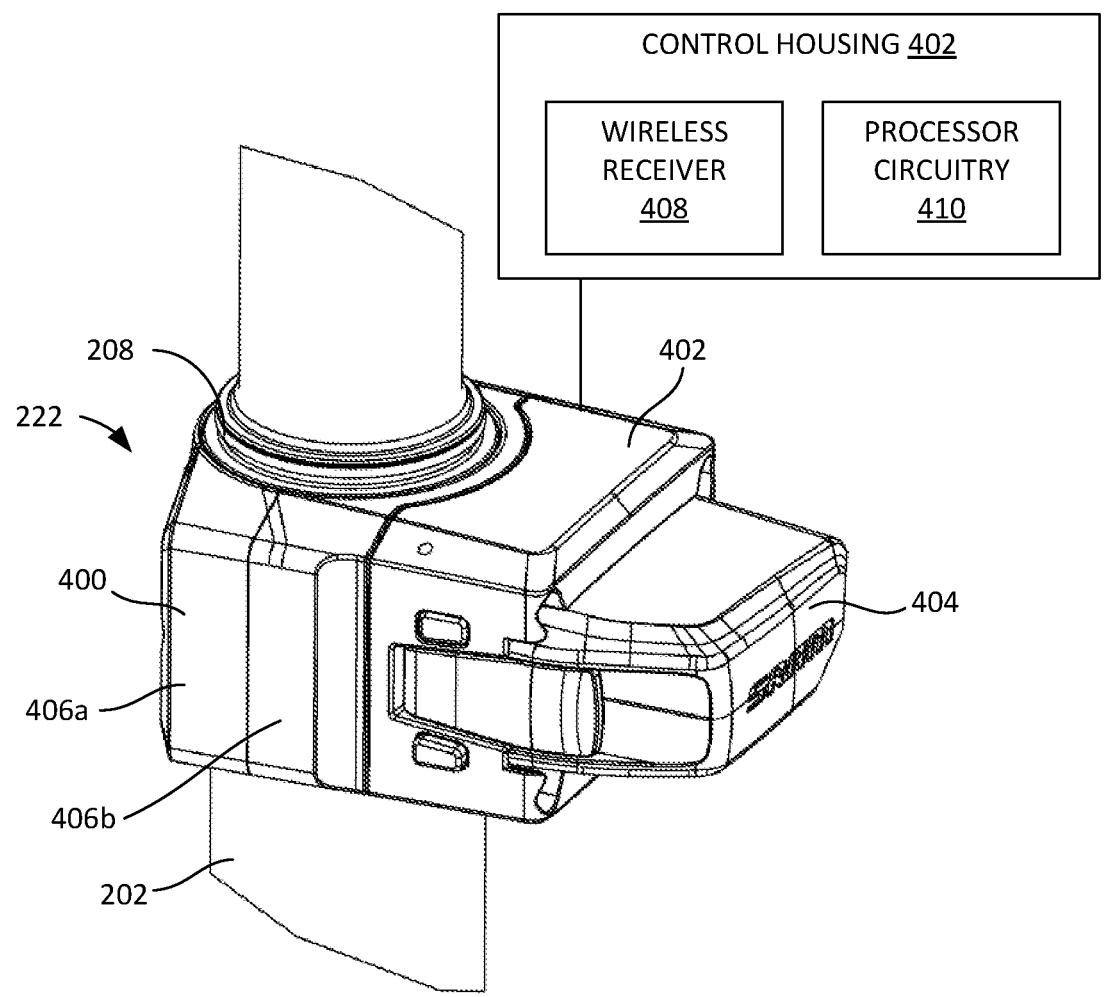
FIG. 4 is an enlarged view of the callout of FIG. 2 showing an example control module that can be implemented on the example height adjustable seat post.

FIG. 4 is an enlarged view of the callout 224 of FIG. 2 showing the control module 222. In the illustrated example, the control module 222 includes a collar 400, a control housing 402 coupled to the collar 400, and a power supply, in this example a battery 404 coupled to the control housing 402. The collar 400 is wrapped around the lower tube 202 and is used to couple the control module 222 to the lower tube 202. In this example, the collar 400 includes a first portion 406a and a second portion 406b that are coupled together and therefore clamped around the lower tube 202. In some examples the first and second portions 402a, 402b are coupled by a snap-fit and/or threaded fasteners (e.g., screws, bolts, etc.). The control housing 402 contains electronic components for receiving control signals and operating the internal valve system (e.g., opening the valve, closing the valve, etc.). For example, FIG. 4 shows a block diagram of the control housing 402. The control housing 402 includes a wireless receiver 408 and processor circuitry 410. The wireless receiver 408 can receive wireless control/command signals from the seat post actuation button. In response to receiving a command, the processor circuitry 410 activates a solenoid by applying a current or voltage to a solenoid. In some examples, the processor circuitry 410 continues to activate the solenoid as long as the seat post actuation button is depressed. When the seat post actuation button is released, no control/command signals are received and the processor circuitry 410 deactivates or shuts off power to the solenoid. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

In the illustrated example of FIG. 4, the electronic components of the control housing 402 receive power from the battery 404. The battery 404 supplied power to energize or activate a solenoid 522 (FIG. 5). In some examples, the battery 404 is removeable. For example, the battery 404 can be removed, charged, and reattached to the control housing 402. In other examples, the battery 404 can be charged while the battery 404 is attached to the control housing 402. Therefore, in this example, the power supply for powering the solenoid 522 is attached to the collar 400 at the upper end 208 of the lower tube 202. The battery 404 is fixed relative to the lower tube 202 (via the collar 400), and fixed relative to the lower tube 202 when installed on the bicycle 100 (FIG. 1).

FIG. 5 is a cross-sectional view of the seat post 200 in the fully extended position corresponding to FIG. 2, and FIG. 6 is a cross-sectional view of the seat post 200 in a partially contracted position corresponding to FIG. 3. FIGS. 5 and 6 are described together. As shown in FIGS. 5 and 6, the upper tube 204 has a lower end 500. The lower end 500 is disposed in the lower tube 202. As such, the lower and upper tubes 202, 204 overlap at an area or region of overlap. In FIG. 5, the lower and upper tubes 202, 204 overlap by a length L1, and in FIG. 6, the lower and upper tubes 202, 204 overlap by a length of L2, which is greater than L1. As such, the height or length of the seat post 200 in FIG. 6 is less than the height or length of the seat post 200 in FIG. 5.

As shown in FIGS. 5 and 6, the upper tube 204 defines a chamber 502. The chamber 502 is filled with fluid (e.g., pneumatic gas), as discussed in further detail herein. The seat post 200 includes an upper plug 504 (e.g., a seal) coupled to the upper tube 204 and disposed in the upper tube 204 at or near the upper end 212. The seat post 200 also includes a lower plug 506 (e.g., a seal) coupled to the upper tube 204 and disposed in the upper tube 204 are or near the lower end 500. The upper and lower plugs 504, 506 seal the ends of the upper tube 204 to maintain the fluid in the chamber 502.

In the illustrated example of FIGS. 5 and 6, the seat post 200 includes a shaft 508, which may be referred to as a piston shaft or rod. The shaft 508 is disposed in the lower tube 202 and coupled to the lower tube 202, such that the shaft 508 is fixed relative to the lower tube 202. In this example, the shaft 508 is coupled to the end cap 220, which is coupled to the lower end 210 of the lower tube 202. However, in other examples, the shaft 508 can be coupled to the lower tube 202 via a mount or other structure. The shaft 508 extends upward through the lower tube 202 into the chamber 502 of the upper tube 204. In particular, the shaft 508 extends through the lower plug 506 and into the upper tube 204. The lower plug 506 is slidable up and down along the shaft 508 as the seat post 200 expands or contracts.

In the illustrated example of FIGS. 5 and 6, the seat post 200 includes a piston assembly 510 disposed in the upper tube 204. The piston assembly 510 may also be referred to as a valve assembly or flow control member. The piston assembly 510 is disposed in the chamber 502 of the upper tube 204 and is coupled to the shaft 508. As the seat tube 200 expands or contracts, the piston assembly 510 is located farther away or closer to, respectively, the upper end of the upper tube 204. The piston assembly 510 includes a piston 512 that is sealed against an inner surface 514 of the upper tube 204. The inner surface 514 of the upper tube 204 is slidable up and down along the piston 512. as the seat post 200 expands or contracts. The piston assembly 510 and, in particular, piston 512, divides the chamber 502 of the upper tube 204 into a first chamber 516 (between the piston 512 and the upper plug 504) and a second chamber 518 (between the piston 512 and the lower plug 506). The first and second chambers 516, 518 may also be referred to as upper and lower chambers, respectively. The volumes of the first and second chambers 516, 518 change as the upper tube 204 moves up and down relative to the piston assembly. The first and second chambers 516, 518 are filled with a fluid. In this example, the seat post 200 is based a pneumatic platform. The first and second chambers 516, 518 are filled with a pressurized gas, such as nitrogen or air. In other examples the first and second chambers 516, 518 can be filled with another type of compressible gas. The piston assembly 510 controls the flow of gas across the piston 512 and between the first and second chambers 516, 518. In this example, a valve 520 is arranged within the piston assembly and is operated by a solenoid 522. As such, the valve 520 and the solenoid 522 are disposed in the upper tube 204 and at least partially in a region of overlap (e.g., L1 or L2) between the upper tube 204 and the lower tube 202. Example valves and solenoids are disclosed herein in further detail. The valve 520 can be operated (e.g., opened or closed) to control the flow of gas across the piston 512 between the first and second chambers 516, 518. In particular, the valve 520 is operable between a closed state in which the fluid (e.g., pressurized gas) is blocked from flowing across the piston 512 between the first and second chambers 516, 518, which locks the lower and upper tubes 202, 204 in position, and an open state to enable the fluid to flow across the piston 512 between the first and second chambers 516, 518, which enables the upper tube 204 to move relative to the lower tube 202 for adjusting the height of the seat 110. The solenoid 522 controls the state of the valve 520, as disclosed in further detail herein.

Figure 7:
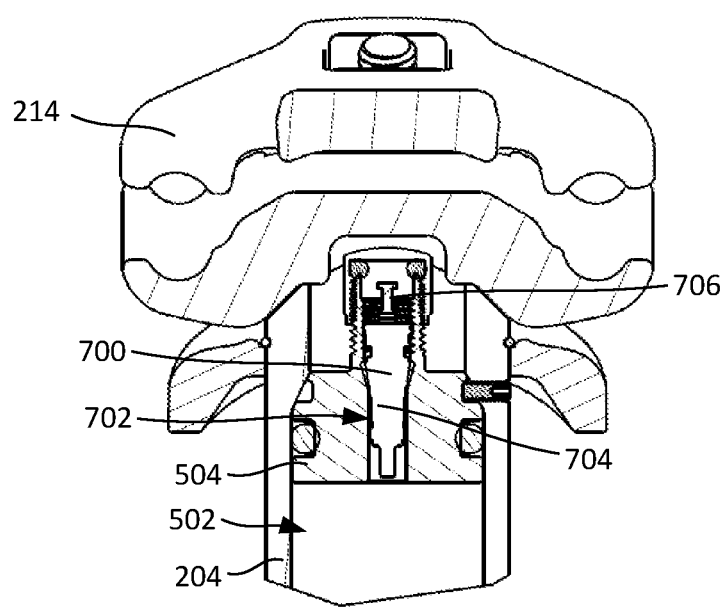
FIG. 7 is an enlarged view of the upper callout of FIG. 5 showing an example valve for adding pneumatic gas to the example height adjustable seat post.

Referring briefly to FIG. 7, FIG. 7 is an enlarged view of the callout 524 of FIG. 5 showing the upper plug 504. The upper plug 504 includes a valve 700, which enables a user to add or remove pneumatic fluid to/from the chamber 502 in the upper tube 204. The valve 700 is disposed in an opening 702 through the upper plug 504. In this example, the valve 700 is implemented as a Schrader valve. However, in other examples, the valve 700 may be implemented as another type of valve, such as a Presta valve. The valve 700 includes a valve body 704 (sometimes referred to as a stem) and a core 706 (e.g., a poppet valve) that controls the flow of fluid through the valve body 704. A user can remove the seat clamp 214 and access the valve 700 to add or remove pneumatic fluid to/from the chamber 502.

Referring back to FIGS. 5 and 6, in this example, the first chamber 516 is a positive pressure chamber and the second chamber 518 is a negative pressure chamber. The first chamber 516 and the second chamber 518 are pressure sealed chambers. The lower tube 202 defines a third chamber 526 between the lower plug 506 and the end cap 220. The third chamber 526 is considered a pressure control chamber. The volume of the third chamber 526 changes based on the actuated position. In some examples, the third chamber 526 contains atmospheric air that is vented to the atmosphere. However, in other examples, the third chamber 526 is also a pressure sealed chamber (e.g., containing compressor air or nitrogen). In such an example, the air in the third chamber 526 may be compressed as the upper tube 204 is moved downward. This compressed air can provide a biasing force to return the seat post 200 to the fully extended position. In other example, the third chamber 526 can have other mechanisms for compensating for the change in volume, such as a floating piston or a deformable bladder. The first chamber 516, the second chamber 518, and the third chamber 526 may be any number of shapes and/or sizes. For example, the first chamber 516, the second chamber 518, and the third chamber 526 may be cylindrically shaped (e.g., with outer diameters between 27 mm and 35 mm, respectively) and may be sized for a particular maximum post adjustment (e.g., 150 mm).

As shown in FIGS. 5 and 6, the piston 512 has a first side 528 facing the upper plug 504 and a second side 530 opposite the first side 528 and facing the lower plug 506. An axial surface area (as viewed along the axis 206) of the first side 528 of the piston 512 is greater than an axial surface area of the second side 530 of the piston 512. This is because a portion of the axial surface area of the second side 530 is reduced by the cross-sectional area of the shaft 508. When the valve 520 is in the closed state and the seat post 200 is in the fully extended position (FIG. 5), the first chamber 516 acts as a spring and is configured to bias the upper tube 204 towards the fully extended position of the seat post 200. The first side 528 and the second side 530 of the piston 512 are sized and shaped, and the first chamber 516 and the second chamber 518 are respectively pressurized when the seat post 200 is in the fully extended position, such that the gas within the first chamber 516 supports the weight rider. In some examples, the seat 110 sags less than 10 mm as a result of the weight of the rider on the seat 110 when the seat post 200 is in the fully extended position. The seat post 200 operates because the axial surface area of the first side 528 of the piston 512 versus a pneumatic pressure ratio between the first chamber 516 and the second chamber 518 holds up the rider based on the force calculation. This is also dependent on the volume of the second chamber 518 at the fully extended position of the seat post 200. In the illustrated example of FIG. 5, the volume of the first chamber 516 is greater than the volume of the second chamber 518 when the seat post 200 is in the fully extended position. In some examples, the volume of the second chamber 518 may be no more than twenty percent of the volume of the first chamber 516 when the seat post 200 is in the fully extended position. In other examples, the first and second chambers 516, 518 may have a different volume ratio in the fully extended position. For example, the volume of the second chamber 518 may be no more than ten percent, five percent, or three percent of the volume of the first chamber 516 when the seat post 200 is in the fully extended position. This makes the seat post 200 act like a zero negative pressure preloaded pneumatic spring. This is the principal that holds up the rider with a feel the rider experiences as being rigid. At the fully extended position of the seat post 200, the seat 110 may move a small amount, but this movement is typically not perceivable to the rider.

As an example operation, assume the seat post 200 is in the fully extended position shown in FIG. 5 and the rider desires to lower the seat 110 (FIG. 1). The rider presses a seat position actuation button (e.g., on the handlebars 118 FIG. 1), and the control module 222 activates the solenoid 522 to open the valve 520. In some examples, the control module 222 activates the solenoid 522 by applying direct current to the coil. While the valve 520 is open, a force can be applied downward on the seat 110. For example, the rider can sit (or partially sit) on the seat 110 to apply downward pressure with his/her bottom. This downward pressure forces gas from the first chamber 516 to flow through the valve 520 (and across the piston assembly 510) and into the second chamber 518. This enables the upper tube 204 to move downward relative to the upper tube 204, thereby lowering the seat 110. As the upper tube 204 is moved downward, the volume of the first chamber 516 is reduced and the volume of the second chamber 518 is increased. The rider can move (e.g., lower) the seat 110 to any position between the fully extended position and a fully contracted position. FIG. 6 shows the seat post 200 as in an intermediate position between the fully extended position and the fully contracted position.

When the seat 110 is at a desired position, such as the position in FIG. 6, the rider can release the seat post actuation button. The control module 222 deactivates the solenoid 522, which causes the valve 520 to close. When the valve 520 is closed, gas is prevented from flowing across the piston assembly 510 between the first chamber 516 and the second chamber 518. This limits or prevents further relative movement of the upper tube 204 relative to the lower tube 202. When the valve 520 is closed, the balance of forces in the system is such that the axial pressure force acting on the first side 528 of the piston 512 is approximately equal to the axial pressure force acting on the second side 530 of the piston 512. Therefore, when the rider sits on the seat 110, the seat post 200 can support the weight of the rider. In some examples, when the seat post 200 is in an intermediate position (between the fully extended position and the fully contracted position), the seat 110 may sag a small amount (e.g., 40 mm or less) as a result of the weight of the rider. If the seat post 200 is moved to the fully contracted position, the seat clamp 214 contacts the upper end 208 of the lower tube 202 and/or the lower plug 506 contacts the end cap 220. This provides a hard stop to prevent further movement. When the seat post 200 is in the fully contracted position, the seat 110 may not sag due to this hard stop.

When it is desired to raise the seat post 200 back to the fully extended position, the rider presses on the seat post actuation button, and the control module 222 activates the solenoid 522 to open the valve 520. With no external downward force acting on the seat 110 (FIG. 1), the pressure in the first chamber 516 the upper tube 204 causes the upper tube 204 to move upward relative to the lower tube 202 back to the fully extended position. This is because the axial surface area of the first side 528 of the piston 512 is greater than the axial surface area on the second side 530. As such, the force of the pressure in the first chamber 516 acting on the first side 528 of the piston 512 is larger than the force from the pressure in the second chamber 518 acting on the second side 530 of the piston 512. As a result, the upper tube 204 is forced upward to the fully extended position. As the upper tube 204 moves upward, fluid flows across the valve 520 from the second chamber 518 to the first chamber 516. Therefore, the axial pressure force imbalance biases the seat post 200 towards the fully extended position. This enables the seat post 200 to automatically expand back to the fully extended position. When the seat post 200 is fully extended, the rider can release the seat post actuation button, which closes the valve and locks the seat post 200 in the fully extended position.

As disclosed above, in some examples, the third chamber 526 is vented to the atmosphere. As such, the third chamber 526 provides minimal, if any, biasing force on the upper tube 204. However, in other examples, the third chamber 526 can be sealed and pressurized with a positive pressure. In such an example, when the upper tube 204 is moved downward, the volume of the third chamber 526 is reduced, which increases the pressure in the third chamber 526. This pressure acts upward on the lower plug 506 to help bias the upper tube 204 to the fully extended position.

As disclosed above, the control module 222 includes processor circuitry to control and operate the solenoid 522. In the illustrated example of FIGS. 5 and 6, the control module 222 is located on the outer surface 223 of the lower tube 202, while the solenoid 522 is located in the piston assembly 510 in the chamber 502 of the upper tube 204. The seat post 200 can include one or more wires and/or electrical connections to form an electrical path between the control module 222 and the solenoid 522. This enables power and/or command signals to be transferred between the control module 222 and the solenoid 522. For example, as shown in FIG. 5, the seat post 200 includes first and second outer wires 532, 534 disposed in the lower tube 202. In some examples, the first and second outer 532, 534 wires are positive and negative wires. The first and second outer wires 532, 534 are electrically coupled to the control module 222. The first and second outer wires 532, 534 extend through the lower tube 202 to the end cap 220. In other words, in this example, the first and second outer wires 532, 534 extend between the upper end 208 and the lower end 210 of the lower tube 202. In the illustrated example, the first and second outer wires 532, 534 are disposed along an inner surface 536 of the lower tube 202. In some examples, the first and second outer wires 532, 534 are disposed with respective channels formed along the inner surface 536 of the lower tube 202. In some examples the channels are formed of the same material (e.g., aluminum) as the lower tube 202. In other examples, the channels may be formed through the wall of the lower tube 202. In the illustrated example, the first and second outer wires 532, 534 are disposed on opposite sides of the lower tube 202. This may be beneficial to provide separation between the positive and negative wires. However, in other examples, the first and second outer wires 532, 534 can be disposed adjacent each other. In some examples, each of the outer wires 532, 534 has an insulated sheath. In other examples, the outer wires 532, 534 may be sheathed together.

In the illustrated example, the seat post 200 also includes first and second inner wires 538, 540. The first and second inner wires 538, 540 are disposed in the shaft 508 and extend between the solenoid 522 and the end cap 220. In some examples, each of the inner wires 538, 540 has an insulated sheath. In other examples, the inner wires 538, 540 may be sheathed together as a cable with multiple wires. The end cap 220 includes one or more electrical connectors or wire bridging to electrically couple the outer wires 532, 534 and the respective inner wires 538, 540. The outer and inner wires 532, 534, 538, 540 can be soldered or crimped to the electrical connectors in the end cap 220. Therefore, the outer wires 532, 534, the inner wires 538, 540, and the electrical connectors form an electrical path between the control module 222 and the solenoid 522. As such, positive and negative electrical connections are formed between the control module 222 and the solenoid 522. The control module 222 can activate the solenoid 522 by applying power through the electrical connections.

Figure 8:
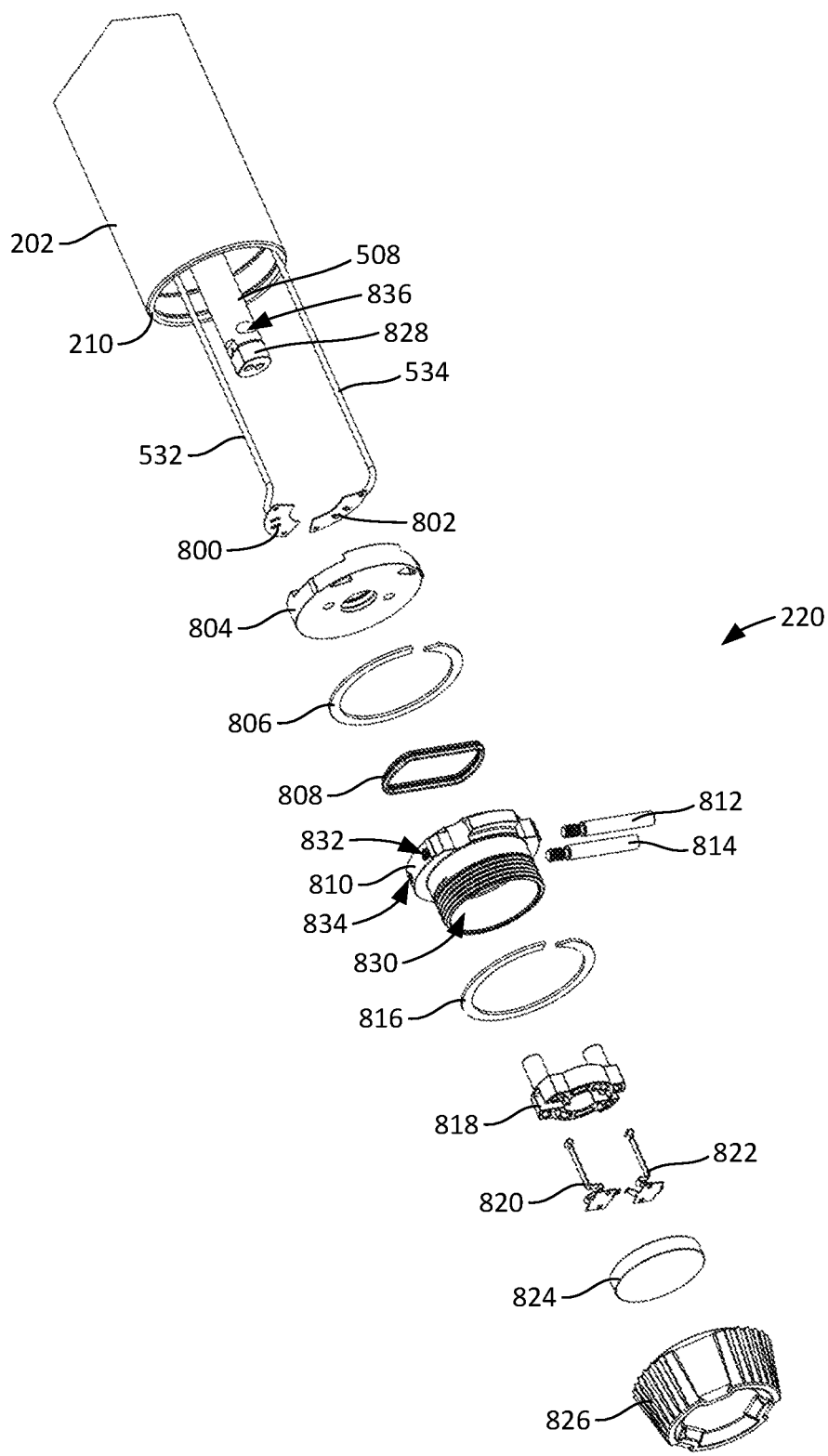
FIG. 8 is an exploded view of an example end cap of the example height adjustable seat post of FIG. 2.

FIG. 8 is an exploded view of the end cap 220. FIG. 8 shows the first and second outer wires 532, 534 extending from the lower end 210 of the lower tube 202. A first outer wire contact 800 is coupled to the first outer wire 532 and a second outer wire contact 802 is coupled to the second outer wire 534. In the illustrated example, the end cap 220 includes an upper plate 804, a first retainer ring 806, a gasket 808, a body 810, first and second threaded cross-pins 812, 814, a second retainer ring 816, a guide 818, first and second inner wire contacts 820, 822 (e.g., electrical connectors), a lower plate 824, and a cover 826. FIG. 8 also shows an inner wire terminal 828 coupled to an end of the shaft 508.

In the illustrated example of FIG. 8, the body 810 has a central opening 830 and first and second threaded openings 832, 834. When the end cap 220 is assembled, the shaft 508 is inserted into the central opening 830 and the first and second threaded cross-pins 812, 814 are screwed into the respective threaded openings 832, 834. The shaft 508 has grooves 836 (only one of which is viewable in FIG. 8) on opposite sides of the shaft 508. The first and second threaded cross-pins 812, 814 extend through the grooves 836. This prevents the shaft 508 from moving linearly and/or rotating relative to the body 510. As such, the shaft 508 is coupled to the end cap 220.

Figure 9:
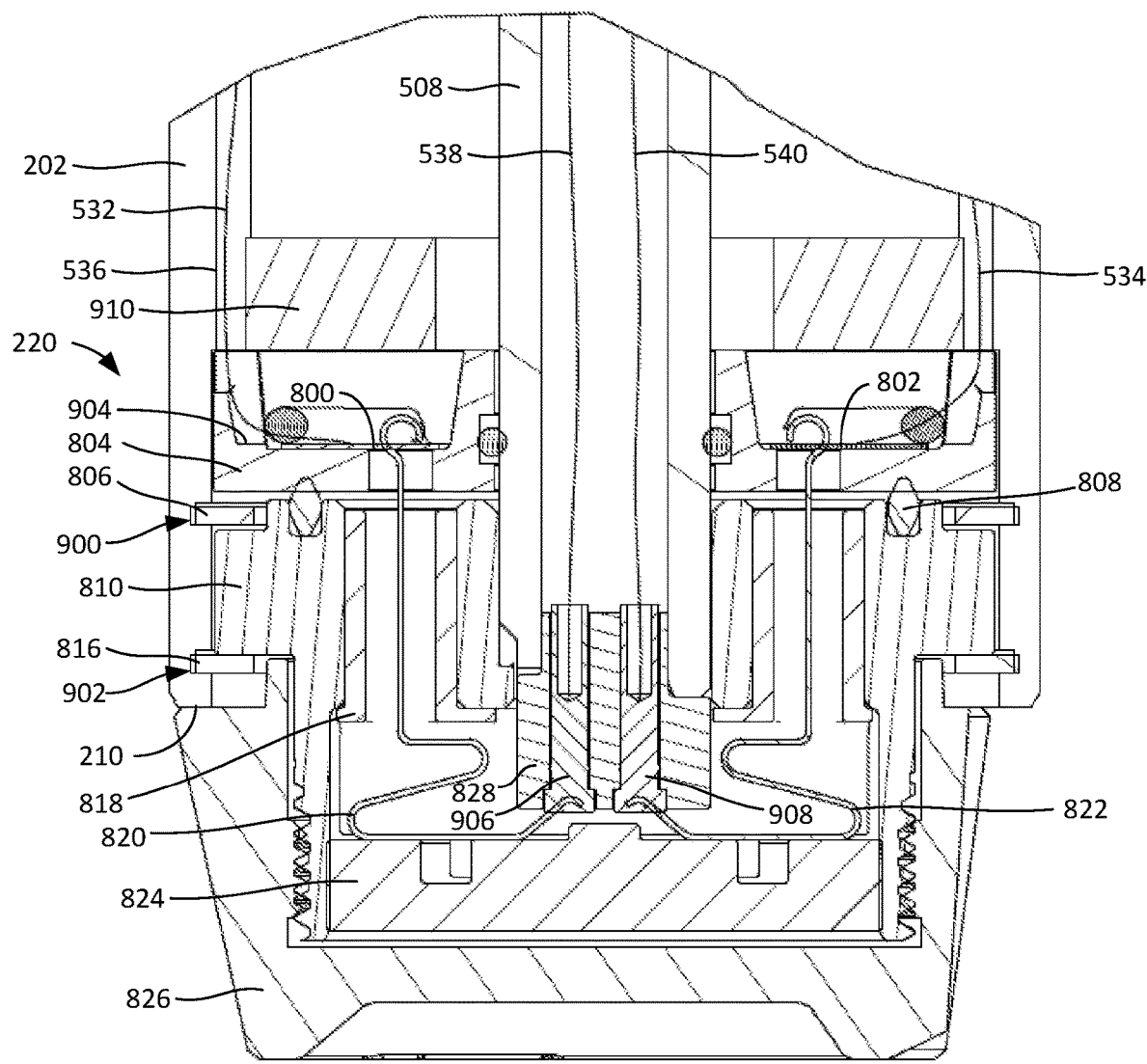
FIG. 9 is an enlarged view of the lower callout of FIG. 5 showing the example end cap in an assembled state.

FIG. 9 is an enlarged view of the callout 542 of FIG. 5 showing the end cap 220 in an assembled state. As shown in FIG. 9, the body 810 is disposed partially in the lower tube 202 and extends outward from the lower end 210 of the lower tube 202. The cover 826 is threaded onto the body 810. The retainer rings 806, 816 are disposed in respective notches 900, 902 formed on the inner surface 536 of the lower tube 202 and secure the body 810 in the lower tube 202. The upper plate 804 is disposed above the body 810. The gasket 808 is disposed between the body 810 and the upper plate 804. The upper plate 804 is clamped between the body 810 and a disc 910 in the lower tube 202. As mentioned above, the first and second outer wires 532, 534 are coupled to the respective first and second outer wire contacts 800, 802. The first and second outer wire contacts 800, 802 are disposed on a top side 904 of the upper plate 804.

In the illustrated example of FIG. 9, the lower plate 824 and the guide 818 are disposed in the body 810. In some examples, the lower plate 824 and the guide 818 are held in the body 810 via friction fit. The first inner wire contact 820 extends upward through the guide 818 and through the upper plate 804 and is in contact with the first outer wire contact 800. Similarly, the second inner wire contact 822 extends upward through the guide 818 and through the upper plate 804 and is in contact with the second outer wire contact 802. The inner wire terminal 828 has first and second pins 906, 908 (e.g., electrical connectors). The first and second inner wires 538, 540 are coupled (e.g., soldered) to the first and second pins 906, 908. The first and second inner wire contacts 820, 822 are in contact with respective ones of the first and second pins 906, 908. As such, the first outer wire contact 800, the first inner wire contact 820, and the first pin 906 form an electrical path between the first outer wire 532 and the first inner wire 538. Similarly, the second outer wire contact 802, the second inner wire contact 822, and the second pin 908 form an electrical path between the second outer wire 534 and the second inner wire 540. In the illustrated example, the first and second inner wire contacts 820, 822 have multiple curves or bends, which enables the first and second inner wire contacts 820, 822 to flex and maintain proper contact during installation and assembly. Therefore, the end cap 220 includes one or more electrical connectors that electrically couple the outer wires 532, 534 and the inner wires 538, 540, such that an electrical path is formed between the control module 222 and the solenoid 522.

Figure 10:
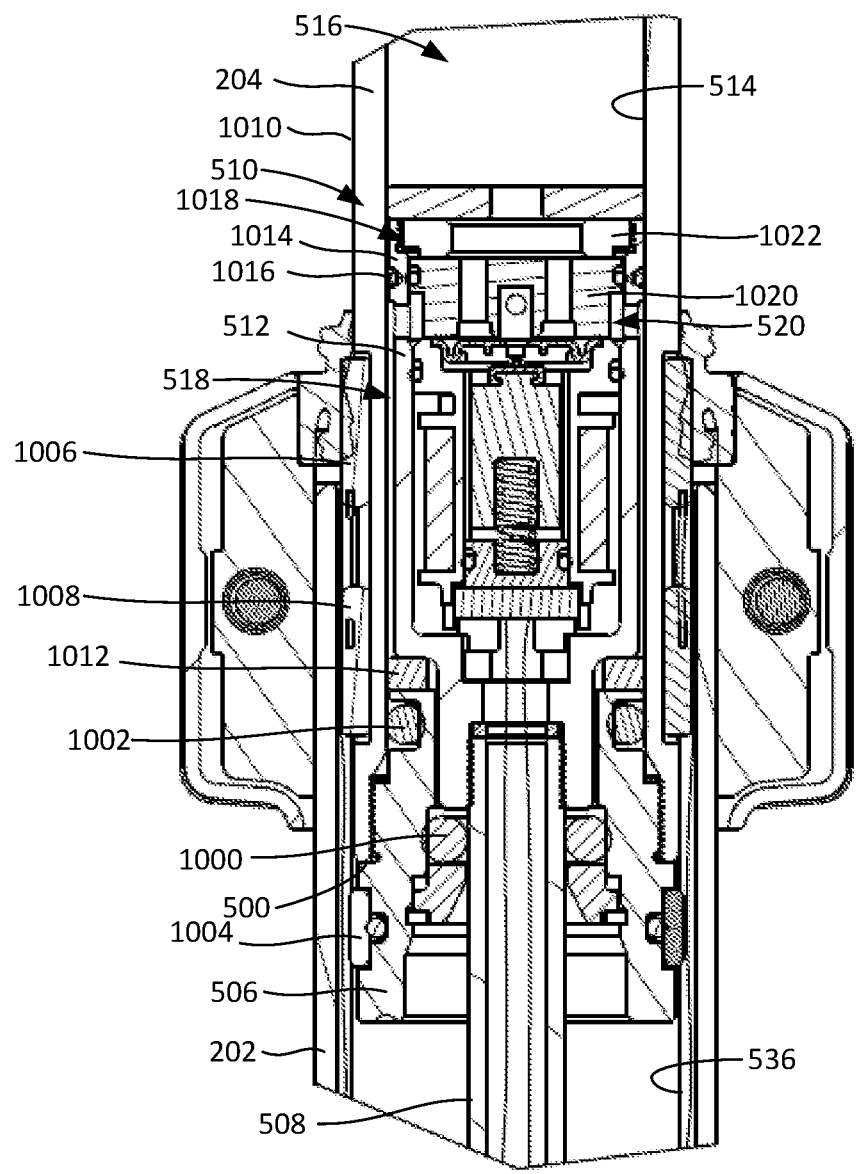
FIG. 10 is an enlarged view of the middle callout of FIG. 5 showing an example piston assembly with an example pilot valve that can be implemented in the example height adjustable seat post.

FIG. 10 is an enlarged view of the callout 544 of FIG. 5 showing the piston assembly 510 in the upper tube 204. As shown in FIG. 10, the lower plug 506 is threadably coupled to the lower end 500 of the upper tube 204, which seals the lower end 500 of the upper tube 204. The seat post 200 includes a shaft seal 1000 between the lower plug 506 and the shaft 508 to prevent leakage through the lower plug 506. The shaft seal 1000 also enables the lower plug 506 to slide smoothly up and down along the shaft 508 as the seat post 200 expands and contracts. The seat post 200 includes a first outer seal 1002 between the lower plug 506 and the inner surface 514 of the upper tube 204, and a second outer seal 1004 between the lower plug 506 and the inner surface 536 of the lower tube 202. The seat post 200 also includes first and second seals 1006, 1008 between an outer surface 1010 of the upper tube 204 and the inner surface 536 of the lower tube 202. In other examples, the seat post 200 can include more or fewer seals and/or the seals can be arranged in other configurations.

In the position shown in FIG. 10, the seat post 200 is in the fully extended position. In this position, the piston 512 is engaged with a seat 1012 on the top of the lower plug 506. This forms a limit or stop that prevents the upper tube 204 from moving any further upward relative to the lower tube 202. In some examples, the seat 1012 is coupled to the top of the lower plug 506.

In the illustrated example, the piston 512 has a head portion 1014. The piston assembly 510 includes a seal 1016 (which may be referred to as a chamber seal) around the head portion 1014 to seal against the inner surface 514 of the upper tube 204. As such, the first chamber 516 is formed above the head portion 1014, and the second chamber 518 is formed below the head portion 1014. The piston 512 has a bore 1018, which forms a portion of a passageway across the piston head 1014 that fluidly connect the first chamber 516 and the second chamber 518, as disclosed in further detail herein.

As disclosed above, the piston assembly 510 includes the valve 520. In the illustrated example the valve 520 is disposed in and/or formed at least partially of the piston 512. In this example, the valve 520 is a pilot valve, referred to herein after the pilot valve 520. Details of the pilot valve 520 are disclosed in further detail herein. In other examples, the piston assembly 510 can include other types of valves, examples of which are also disclosed in further detail herein. In the illustrated example of FIG. 10, the pilot valve 520 includes a valve body 1020 disposed in the bore 1018 of the piston 512. The piston assembly 510 includes a retainer 1022 coupled to the piston 512 and disposed above the valve body 1020 to retain the valve body 1020 in the piston 512. The valve body 1020 includes one or more passageways (disclosed in further detail herein) that enable fluid flow through the bore 1018 and across the piston head 1014 between the first chamber 516 and the second chamber 518. The pilot valve 520 is operable between an open position or state to allow fluid flow through the passageways and between the first and second chambers 516, 518 and a closed state or position to block or prevent fluid flow through the passageways and between the first and second chambers 516, 518.

Figure 11:
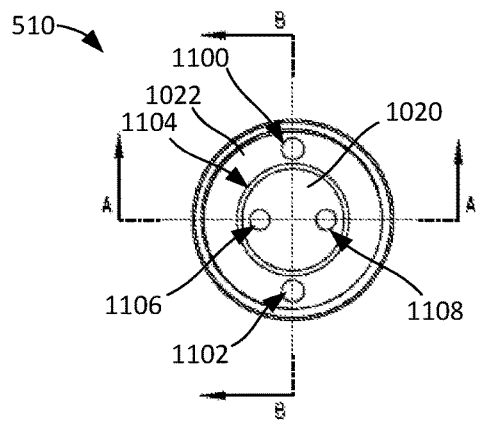
FIG. 11 is a top view of the example piston assembly of FIG. 10.
Figure 12:
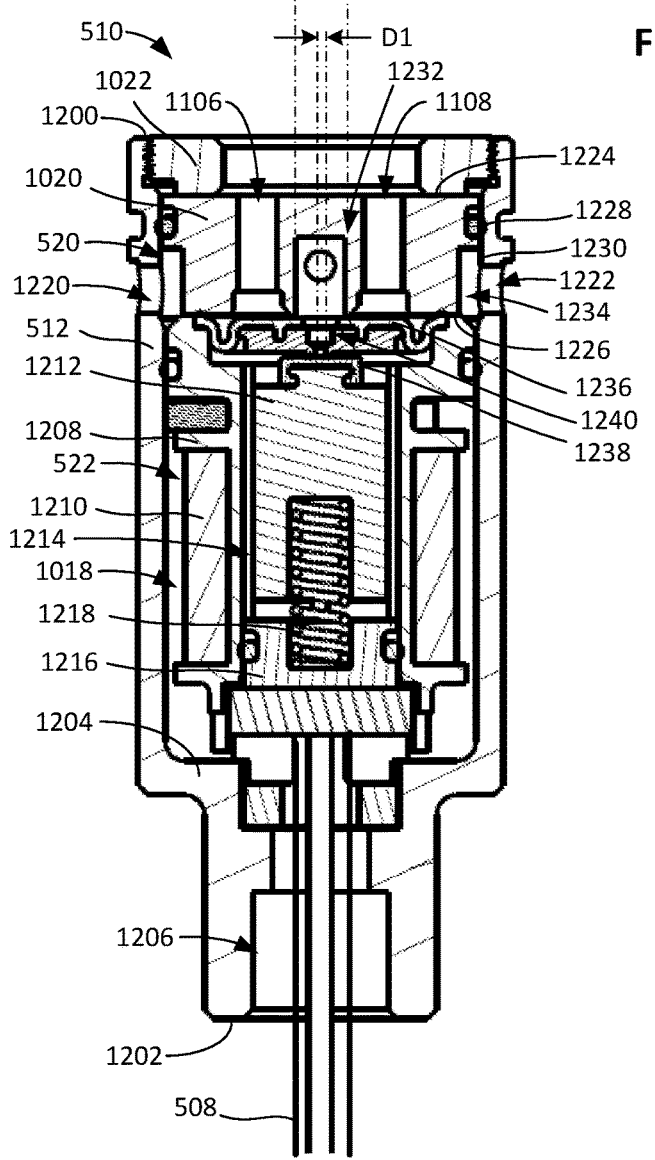
FIG. 12 is a cross-sectional view of the example piston assembly taken along lines A-A of FIG. 11.
Figure 13:
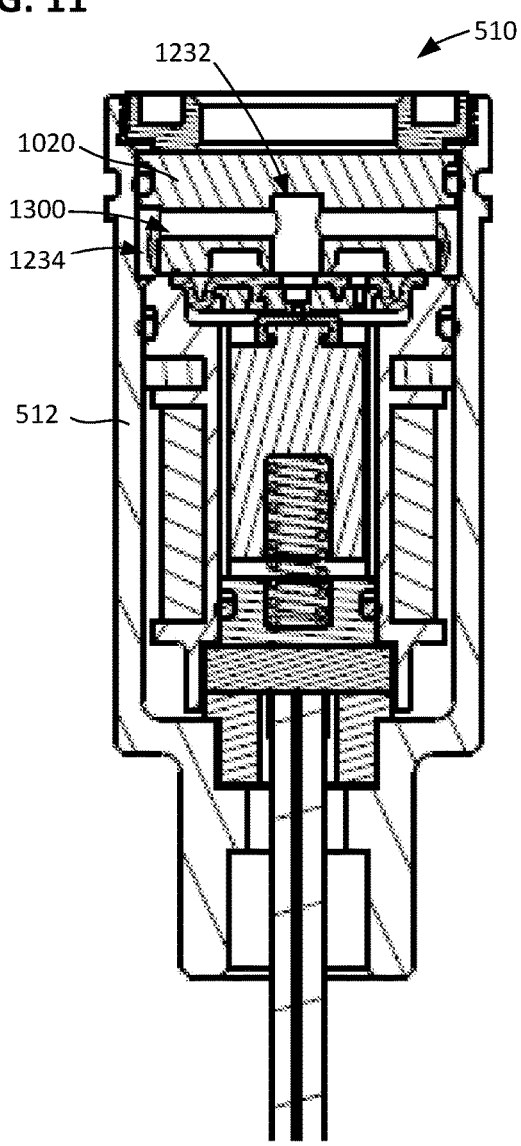
FIG. 13 is a cross-sectional view of the example piston assembly taken along lines B-B of FIG. 11.

FIG. 11 is a top view of the piston assembly 510. As shown in FIG. 11, the retainer 1022 has first and second bores 1100, 1102. The retainer 1022 has a central opening 1104. The valve body 1020 has first and second channels 1106, 1108, disclosed in further detail herein. FIG. 12 is a cross-sectional view of the piston assembly 510 taken along line A-A of FIG. 11, and FIG. 13 is a cross-sectional view of the piston assembly 510 taken along line B-B of FIG. 11.

Referring to FIG. 12, the piston 512 has a first side 1200 and a second side 1202 opposite the first side 1200. The bore 1018 extends into the first side 1200 of the piston 512. In this example, the pilot valve 520 and the solenoid 522 are disposed in the bore 1018 and, thus, in the piston 512. The retainer 1022 is threadably coupled to the piston 512 at or near the first side 1200, which clamps the valve pilot 520 and the solenoid 522 between the retainer 1022 and a shoulder 1204 in the piston 512. As such, the pilot valve 520 and the solenoid 522 are secured in the piston 512. The shaft 508 extends into an opening 1206 in the second side 1202 of the piston 512 and is coupled to the piston 512 (e.g., via friction fit, via a threaded connection, etc.).

In the illustrated example, the solenoid 522 includes a core 1208, a coil 1210 (e.g., copper windings) wrapped around the core 1208, and an armature 1212. In the illustrated example, the core 1208 defines a central passage or channel 1214. The armature 1212 is slidably disposed in the central channel 1214 of the core 1208. In this example, the armature 1212 operates as a plug or plunger of the pilot valve 520. Therefore, the armature 1212 may be referred to herein as the plunger 1212 of the pilot valve 520. The solenoid 522 includes a spring retainer 1216 disposed in the channel 1214. The solenoid 522 also includes a spring 1218 disposed between the plunger 1212 and the spring retainer 1216. The spring 1218 biases the plunger 1212 in the upward direction in FIG. 12, which corresponds to the closed state of the pilot valve 520.

In the illustrated example of FIG. 12, the piston 512 has two radial openings 1220, 1222 that extend through the piston 512 and fluidly connect the bore 1018 and the outside of the piston 512, which corresponds to the second chamber 518 (FIG. 5). While in this example the piston 512 include two radial openings, in other examples, the piston 512 may include only one radial opening or can include more than two radial openings.

In the illustrated example of FIG. 12, the valve body 1020 has a first side 1224 and a second side 1226 opposite the first side 1224. The piston assembly 510 includes a seal 1228 between the valve body 1020 and inner surface 1230 of the piston 512. The channels 1106, 1108 are formed through the valve body between the first side 1224 and second side 1226. As such, the channels 1106, 1108 are in fluid communication with the fluid in the first chamber 516.

As shown in FIG. 12, the valve body 1020 has a bore 1232 extending upward from the second side 1226 but does not extend all the way to the first side 1224. As shown in FIG. 13, the valve body 1020 has a transverse channel 1300 that extends across valve body 1020 and intersects the bore 1232. In this example, the lower section of the valve body 1020 has a smaller diameter than the inner surface 1230 of the piston 512 and therefore an annular channel 1234 is formed between the valve body 1020 and the inner surface 1230 of the piston 512. As such, the radial openings 1220, 1222, the channel 1234, the transverse channel 1300, and the bore 1232 are in fluid communication with the fluid in the second chamber 518 (FIG. 10).

As shown in FIG. 12, the pilot valve 520 includes a first seal 1236 and a second seal 1238. The first seal 1236 is disposed along the second side 1226 of the valve body 1020. In the position shown in FIG. 12, the first seal 1236 is in contact with the second side 1226. The first seal 1236 has an opening 1240 (e.g., a bleed port), referred to as a pilot opening 1240, aligned with the bore 1232. The second seal 1238 is coupled to the plunger 1212. In FIGS. 12 and 13 the pilot valve 520 is in the closed position. This occurs when the solenoid 522 is not activated or powered. When the solenoid 522 is not activated, the plunger 1212 is biased upward by the spring 1218 and into the first seal 1236. In FIGS. 12 and 13, the plunger 1212 is in a first position. In this position, the second seal 1238 is engaged with the first seal 1236 and blocking the pilot opening 1240. This force also pushes the first seal 1236 against the second side 1226 of the valve body 1020. As such, the first seal 1236 blocks or prevents fluid from flowing between the bore 1232 and the first and second channels 1106, 1108 and, thus, between the first chamber 516 (FIG. 10) and the second chamber 518

(FIG. 10). As such, when the pilot valve 520 is in the closed state, the pilot valve 520 blocks fluid communication between the first and second chambers 516, 518 (the positive and negative pressure chambers) to lock the upper tube 204 and the lower tube 202 in position relative to each other.

Figure 15:
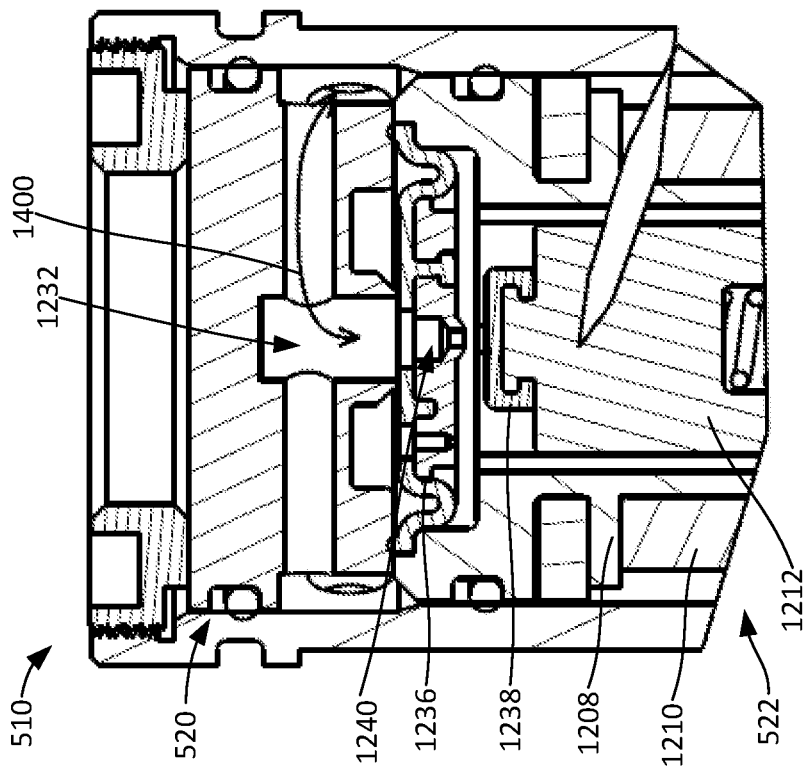
FIG. 15 is the same cross-sectional view as FIG. 13 showing the example pilot valve in the initially open state.
Figure 14:
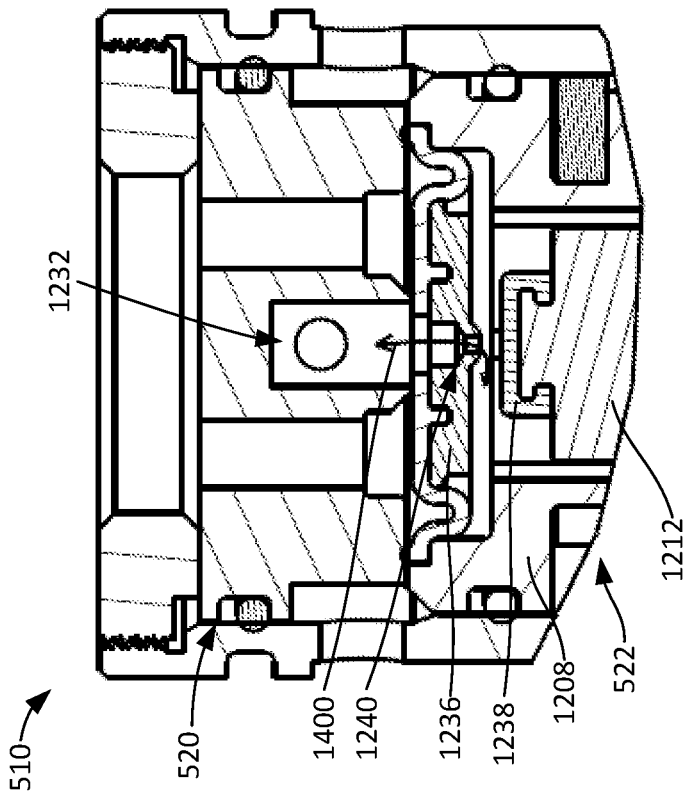
FIG. 14 is the same cross-sectional view as FIG. 12 showing the example pilot valve in an initially open state.

FIGS. 14 and 15 are cross-sectional views of the piston assembly 510 taken along the planes of FIGS. 12 and 13, respectively. FIGS. 14 and 15 show the state of the valve 520 after the solenoid 522 has been initially activated or turned on. The control module 222 (FIG. 2) activates the solenoid 522 by applying a current to the coil 1210. The core 1208 may be constructed of a ferrous material (e.g., iron). The current in the coil 1210 induces a magnetic field around the core 1208. The plunger 1212 (the armature) is constructed of a metallic material (e.g., iron). As such, the magnetic field pulls the plunger 1212 (the armature) downward to a second position as shown in FIGS. 14 and 15. As a result, the second seal 1238 on the plunger 1212 is spaced from the first seal 1236. This opens the pilot opening 1240. As shown by the fluid flow lines 1400, fluid from the bore 1232 (which is at the same pressure as the second chamber 518 (FIG. 10)), flows through the pilot opening 1240 to an area below the first seal 1236. This substantially balances or equalizes the pressures on the top and bottom sides of the first seal 1236. This enables the first seal 1236 to open with less force.

Figure 17:
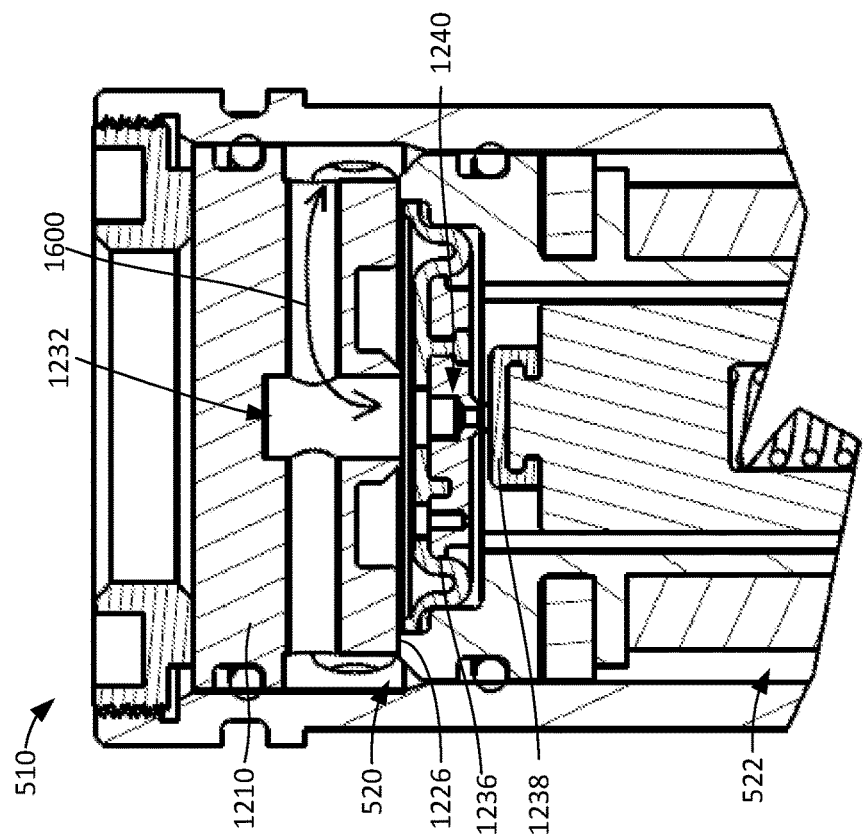
FIG. 17 is the same cross-sectional view as FIGS. 13 and 15 showing the example pilot valve in the fully open state.
Figure 16:
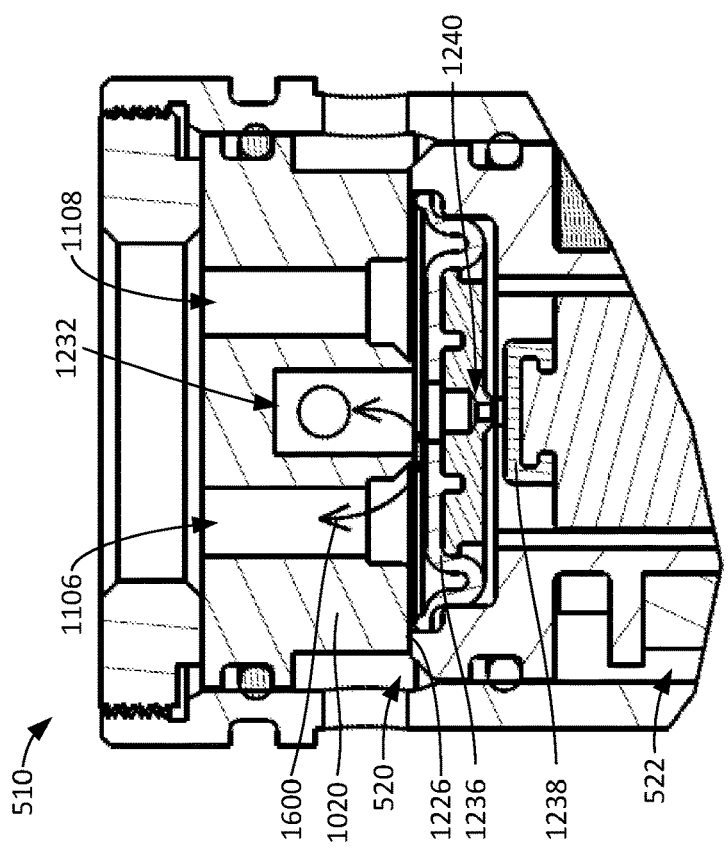
FIG. 16 is the same cross-sectional view as FIGS. 12 and 14 showing the example pilot valve in a fully open state.

FIGS. 16 and 17 are cross-sectional views of the piston assembly 510 taken along the planes of FIGS. 12 and 13, respectively, showing the state of the valve 520 after the solenoid 522 has been activated for a period of time (e.g., 10 milliseconds (ms), one second, etc.). After the pressure substantially equalizes across the first seal 1236, the first seal 1236 opens by moving away from the second side 1226 of the valve body 1020. This occurs because of higher pressure in the first and second channels 1106, 1108 acting downward on the first seal 1236. As a result, as shown by the fluid flow lines 1600, fluid can flow between the first and second channels 1106, 1108 (which are in fluid communication with the first chamber 516 (FIG. 10)) and the bore 1232 (which is in fluid communication with the second chamber 518 (FIG. 10)). This allows the upper tube 204 (FIG. 2) to move relative to the lower tube 202 (FIG. 2) to adjust the height of the seat 110 (FIG. 1). The flow rate when the first seal 1236 is open is larger than the initial opening process shown in FIGS. 14 and 15.

When it is desired to close the pilot valve 520, the solenoid 522 is deactivated or shut off. Without the magnetic field, the spring 1218 biases the plunger 1212 upward and into the first seal 1236, which closes the pilot opening 1240 and pushes the first seal 1236 into the second side 1226 of the valve body 1020. Therefore, in this example, when the solenoid 522 is activated, the plunger 1212 (the armature) is moved in a first direction (e.g., downward) to open the pilot valve 520, and when the solenoid 522 is deactivated, the plunger 1212 (the armature) is moved in a second direction (e.g., upward) to close the pilot valve 520. In this example the plunger 1212 (the armature) is biased in the second direction via the spring 1218. Additionally or alternatively, the valve can be configured such that the pneumatic pressure biases the plunger 1212 (the armature) in the second direction, examples of which are disclosed in further detail herein.

As described above, when the pilot valve 520 is closed, the second seal 1238 is in contact with the first seal 1236 and blocks the pilot opening 1240, and the first seal 1236 is in contact with the valve body 1020 and blocks the bore 1232. Referring back to FIG. 12, the second seal 1238 and the pilot opening 1240 on the bottom side of the first seal 1236 form or define a first sealed opening having a first seal diameter D1, and the first seal 1236 and the bore 1232 on the second side 1226 of the valve body 1020 form or define a second sealed opening having a second seal diameter D2. In this example, the first seal diameter D1 is smaller than second seal diameter D2. As such, the first sealed opening requires less force to open than the second sealed opening. By opening the pilot opening 1240 (the first sealed opening) first to substantially equalize the pressure across the first seal 1236, this enables the first seal 1236 (the second sealed opening) to open with less force. This also reduces the electrical power needed to open the pilot valve 520. In some examples, when activating the solenoid 522, the control module 222 initially applies a higher current to the coil 1210 to move the plunger 1212 (the armature) downward and then reduces the current to a lower current. Once the plunger 1212 is moved downward or closer to the core 1208, less magnetic force is needed to keep the plunger 1212 in the second position. Thus, less current is needed to generate a magnetic field sufficient to hold the plunger 1212 in place. Therefore, the control module 222 reduces the current once the plunger 1212 is moved to the second position and, thus, reduces the total power consumed by the solenoid 522.

Figure 18A:
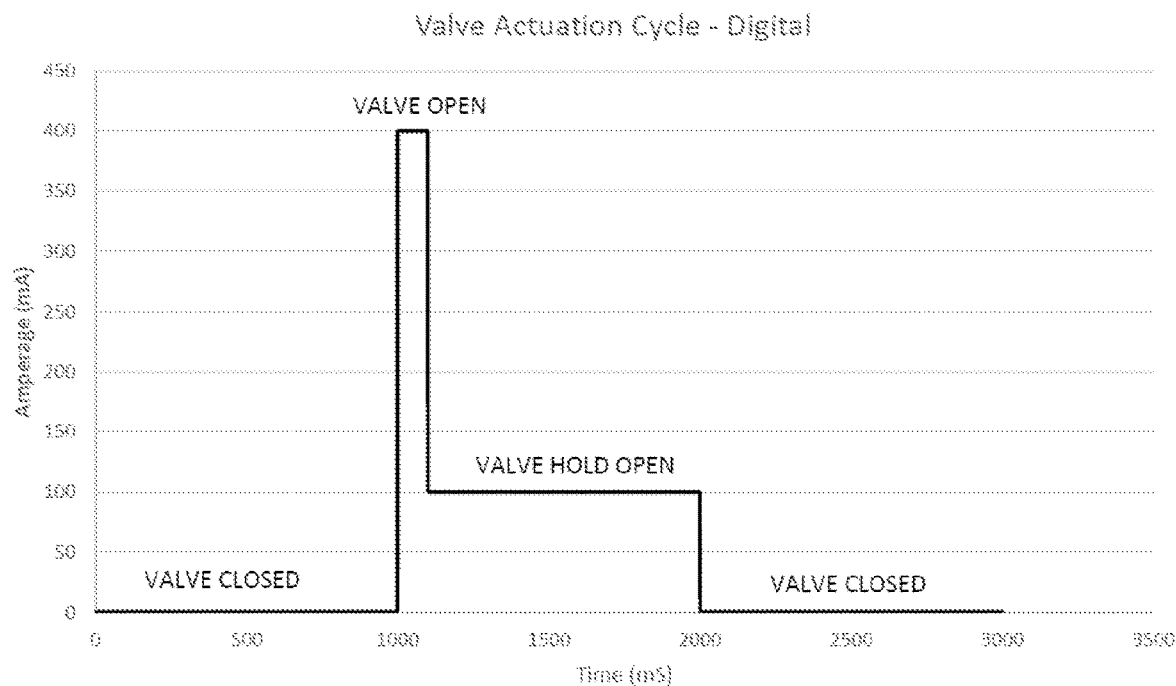
FIGS. 18A and 18B are example graphs illustrating digital and analog actuation cycles that can be implemented for operating any of the example valves disclosed herein.
Figure 18B:
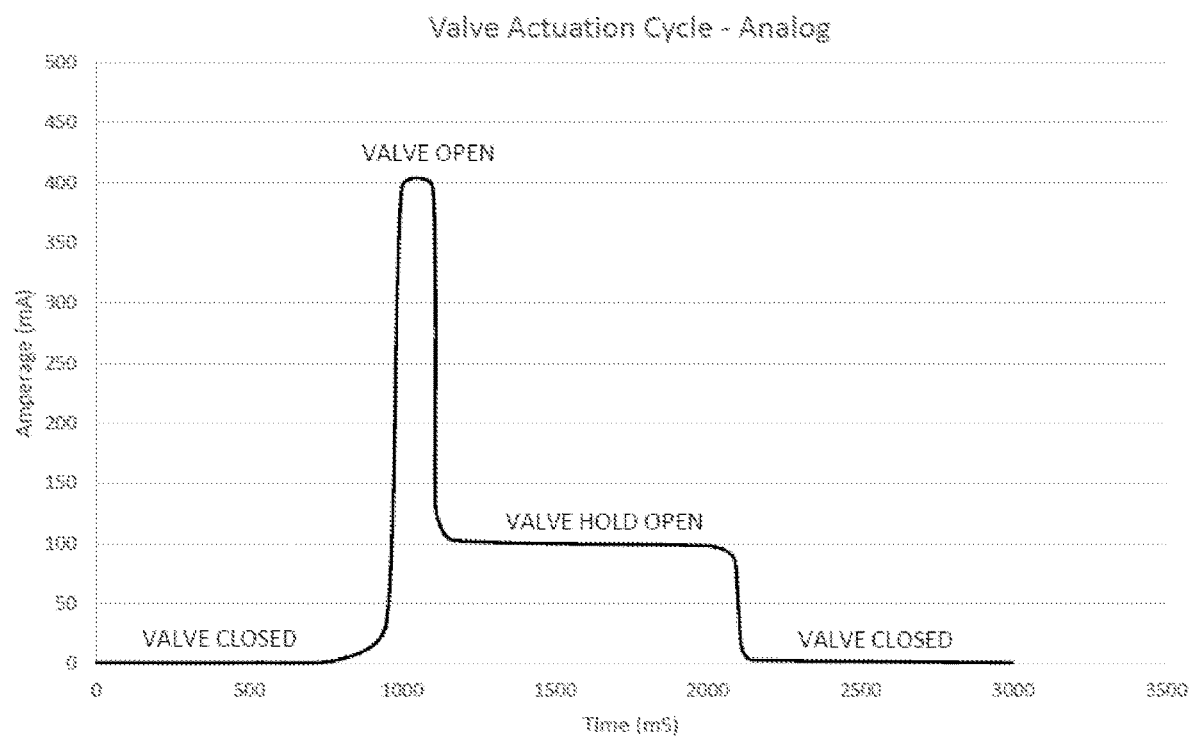

FIGS. 18A and 18B are example graphs showing the applied current (in mA) versus time that can be produced by the example control module 222 to open and close the pilot valve 520. The control module 222 may activate the solenoid 522 using digital or analog control power. FIG. 18A shows an example digital valve actuation cycle and FIG. 18B shows an example analog actuation cycle. Between 0 and 1000 ms no current is applied and therefore the pilot valve 520 remains closed by the bias of the spring 1218. At time 1000 ms, the control module 222 applies a first current (e.g., 400 milliamps (mA)) to the coil 1210 to move the plunger 1212 downward to overcome the bias of the spring 1218. This opens the pilot opening 1240 as shown in FIGS. 14 and 15 and allows fluid to flow through the pilot open 1240 and substantially balance the first seal 1236. Then, after a relatively short time (e.g., 100 ms), the applied current can be reduced to a second current (e.g., 100 mA). As described above, once the plunger 1212 is near the core 1208, the attractive force is stronger between the core 1208 and the plunger 1212, so a lower magnetic field can be used to maintain the plunger 1212 in place. By reducing the current, less energy is used to operate the example solenoid 522. Thus, the example solenoid 522 is more energy efficient than known solenoids that apply the same high current throughout activation. The pilot valve 520 can be held in this open state for any length of time. When it desired to close the pilot valve 520, the control module 222 deactivates or turns off power to the solenoid 522 by reducing the current back to 0 mA. The spring 1218 biases the plunger 1212 into the first seal 1236, which closes the pilot open 1240 and pushes the first seal 1236 into the second side 1226 of the valve body 1020. Therefore, the solenoid 522 may have a valve closed no power state, a valve actuation power state, and a valve hold power state. These current levels and periods of time can be optimized to reduce overall energy usage to increase (e.g., maximize) battery life and reduce (e.g., minimize) battery size. The example current levels shown are for a nominal 7.4 volts. However, in other examples, the voltage supply can be higher or lower. In some examples, the voltage supply can be as high as 36 volts or higher. As shown in the digital and analog actuation cycles of FIGS. 18A and 18B, the electrical current profiles may have smooth transitions and/or ramps. Electrical current levels can change quickly or more slowly when transitioning to a different state to reduce accelerations and decelerations on the valve components, seals, fluids, and springs. The current levels within specific states may vary in a way to optimize performance, energy usage, and valve speed.

Figures 19, 20, 21:
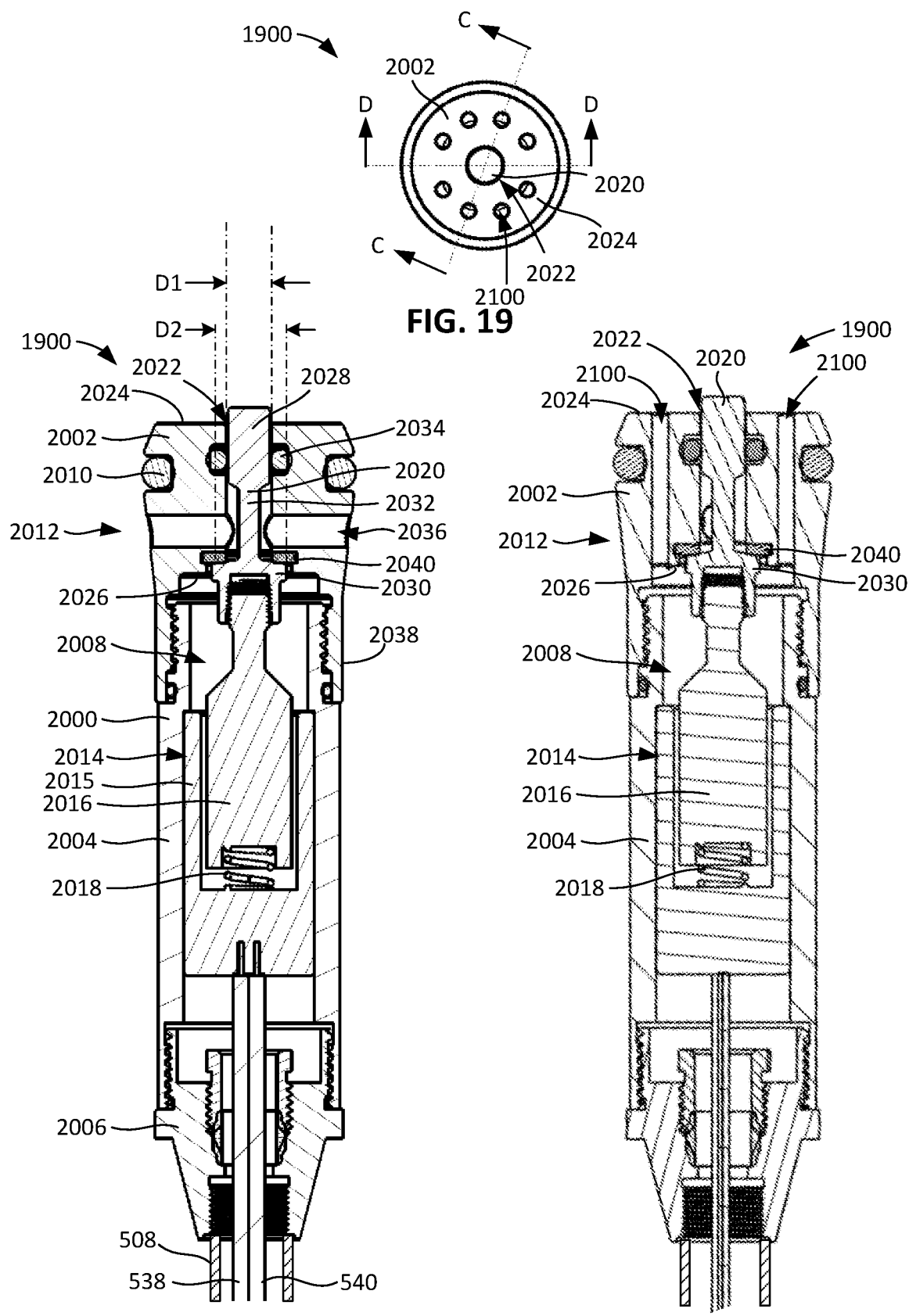
FIG. 19 is a top view of an example piston assembly with an example face valve that can be implemented in the example height adjustable seat post of FIG. 2.
FIG. 20 is a cross-sectional view of the example piston assembly taken along lines C-C of FIG. 19.
FIG. 21 is a cross-sectional view of the example piston assembly taken along lines D-D of FIG. 19.

FIGS. 19, 20, and 21 illustrate another example piston assembly 1900 that can be implemented in the seat post 200. In this example, the piston assembly 1900 includes an example face valve, disclosed in further detail herein. FIG. 19 is a top view of the example piston assembly 1900 and FIGS. 20 and 21 are cross-sectional views of the example piston assembly 1900 taken along line C-C and line D-D of FIG. 19, respectively.

Referring to FIG. 20, the piston assembly 1900 can be coupled (e.g., threadably coupled) to the shaft 508. In the illustrated example, the piston assembly 1900 includes a piston 2000 formed by a first body 2002, a second body 2004, and a third body 2006. The first and third bodies 2002, 2006 are coupled (e.g., threadably coupled) to opposite ends of the second body 2004. The second body 2004 defines an inner cavity or chamber 2008. The piston assembly 1900 includes a seal 2010 around the first body 2002, which seals against the inner surface 514 (FIG. 5) of the upper tube 204 (FIG. 2). The first body 2002 forms the piston head section of the piston 2000. The seal 2010 separates the first chamber 516 (above the seal 2010) and the second chamber 518 (below the seal 2010).

In the illustrated example of FIG. 20, the piston assembly 1900 includes a face valve 2012 and a solenoid 2014 to operate the face valve 2012. The face valve 2012 is formed at least partially by one or more channels or passages in the piston 2000, as disclosed in further detail herein. In FIGS. 20 and 21, the face valve 2012 is in a closed state or position. The solenoid 2014 can be activated to open the face valve 2012. As shown in FIG. 20, the solenoid 2014 is disposed in the cavity 2008 of the piston 2000. The inner wires 538, 540 are connected to the solenoid 2014, which enable the control module 222 (FIG. 2) to activate or deactivate the solenoid 2014. The solenoid 2014 includes a core with a coil 2015, an armature 2016 (which may also be referred to as a plunger), and a spring 2018 that biases the armature 2016 in the upward direction in FIGS. 20 and 21. When the solenoid 2014 is activated, the armature 2016 is moved in the downward direction in FIG. 20, as shown in further detail herein.

In the illustrated example of FIG. 20, the face valve 2012 includes a plug 2020 coupled to the armature 2016. As shown in FIGS. 19 and 20, the first body 2002 has a central channel 2022 extending between a first side 2024 and a second side 2026 of the first body 2002. The plug 2020 is slidably disposed in the central channel 2022. In the illustrated example of FIG. 20, the plug 2020 has a first sealing portion 2028, a second sealing portion 2030, and a shaft portion 2032 between the first and second sealing portions 2028, 2030. The first and second sealing portions 2028, 2030 can also be referred to as poppets.

As shown in FIG. 20, the face valve 2012 includes a first seal 2034 in the central channel 2022 and engaged with the first sealing portion 2028 of the plug 2020. This prevents fluid leaking through the central channel 2022 past the first sealing portion 2028. In the illustrated example, the first body 2002 has a transverse channel 2036 that intersects the central channel 2022 and extends to an outer surface 2038 of the piston 2000. As such, the transverse channel 2036 and a portion of the central channel 2022 (below the first sealing portion 2028) are in fluid communication with the fluid in the second chamber 518 (FIG. 5).

As shown in FIGS. 19 and 21, the first body 2002 has a plurality of channels 2100 (one of which is referenced in FIG. 19) extending between the first side 2024 and the second side 2026 of the first body 2002. The channels 2100 are parallel to and separate from the central channel 2022. As such, the channels 2100 and the cavity 2008 in the second body 2004 are in fluid communication with the fluid in the first chamber 516 (FIG. 5). In this example, the first body 2002 has eight channels 2100. The channels 2100 are spaced equidistant from each other and arranged circumferentially around the central channel 2022. In other examples the first body 2002 can include more or fewer channels and/or the channels can be arranged in other configurations.

As shown in FIGS. 20 and 21, the face valve 2012 includes a second seal 2040 coupled to the first body 2002 and disposed in the central channel 2022 below the transverse channel 2036. When the solenoid 2014 is not activated, the armature 2016 is biased upward by the spring 2018 such that the second sealing portion 2030 of the plug 2020 is engaged with the second seal 2040. This prevents or blocks fluid from flowing between the central channel 2022 (which is in fluid communication with the second chamber 518) and the cavity 2008 (which is in fluid communication with the first chamber 516). As such, when the face valve 2012 is in the closed position, the face valve 2012 blocks communication between the first and second chambers 516, 518 (the positive and negative pressure chambers) to lock the upper tube 204 and the lower tube 202 in position relative to each other.

Figure 23:
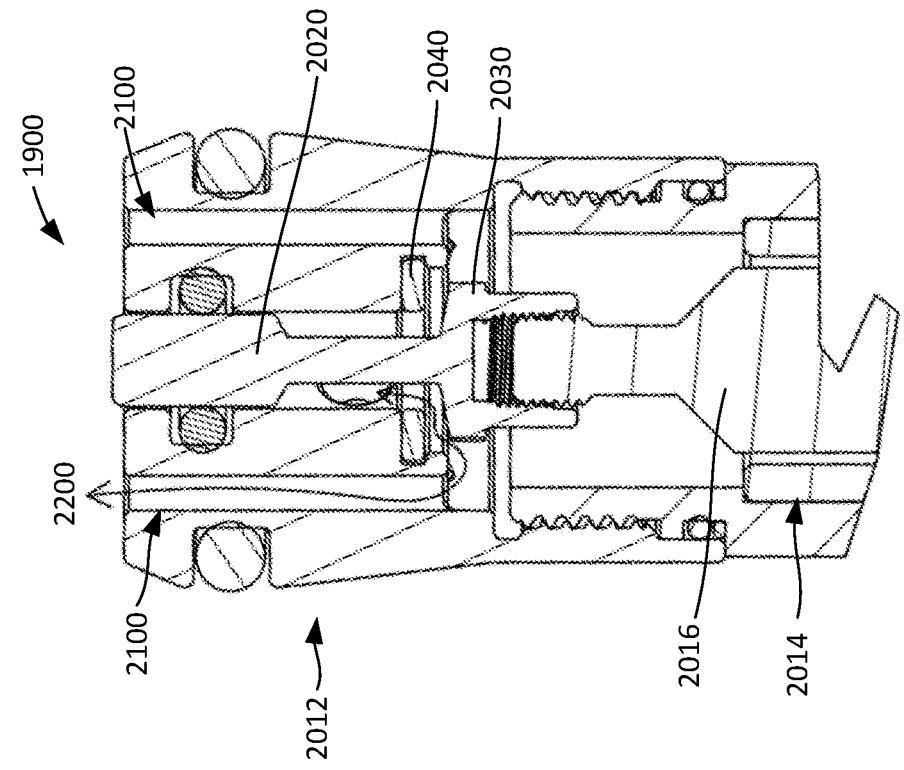
FIG. 23 is the same cross-sectional view as FIG. 21 showing the example face valve in the open state.
Figure 22:
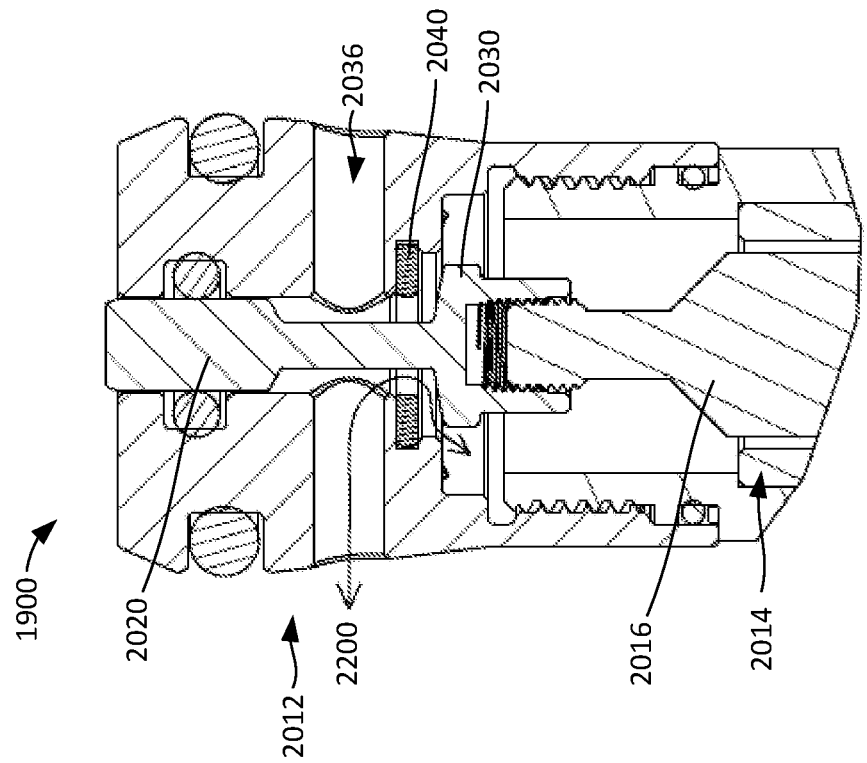
FIG. 22 is the same cross-sectional view as FIG. 20 showing the example face valve in an open state.

FIGS. 22 and 23 are cross-sectional views of the piston assembly 1900 taken along the same planes of FIGS. 20 and 21, respectively. FIGS. 22 and 23 show the face valve 2012 in an open state or position after the solenoid 2014 has been activated. When it is desired to open the face valve 2012, the control module 222 (FIG. 2) activates or turns on the solenoid 2014 by applying a current to the solenoid 2014. The magnetic field generated by the solenoid 2014 causes the armature 2016 to move downward, which pulls the plug 2020 downward. As such, the second sealing portion 2030 of the plug 2020 is moved away from the second seal 2040. As shown by the fluid flow lines 2200, fluid can flow through the second seal 2040 and, thus, between the channels 2100 (which are in fluid communication with the first chamber 516 (FIG. 5)) and the transverse channel 2036 (which is in fluid communication with the second chamber 518 (FIG. 5)). As such, the face valve 2012 is open and allows fluid flow between the first and second chambers 516, 518 (the positive and negative pressure chambers). This allows the upper tube 204 (FIG. 2) to move relative to the lower tube 202 (FIG. 2) to adjust the height of the seat 110 (FIG. 1). Therefore, when the solenoid 2014 is activated, the armature 2016 is moved in a first direction (e.g., downward) to open the face valve 2012, and when the solenoid 2014 is deactivated, the armature 2016 is moved in a second direction (e.g., upward) to close the face valve 2012. In this example, the spring 2018 biases the armature 2016 and the plug 2020 in the second direction. Additionally, in some examples, the air pressure differential on the plug 2020 biases the plug 2020 in the second direction.

Referring back to FIG. 20, when the face valve 2012 is closed, the first sealing portion 2028 and the first seal 2034 form or define a first seal diameter D1, and the second sealing portion 2030 and the second seal 2040 form or define a second seal diameter D2. In this example, the first seal diameter D1 is smaller than the second seal diameter D2. This difference creates a biasing force when under fluid or gas pressure that reduces the energy required by the solenoid 2014 to move the plug 2020 and/or hold the plug 2020 in the different states. For example, when the plug 2020 is in the closed position, a first biasing force acts on the plug 2020 in the upward direction, and when the plug 2020 is in the open position, a second biasing force acts on the plug 2020 in the upward direction, which is less than the first biasing force. In other words, the first biasing force on the plug 2020 when the face valve 2012 is in the closed state is greater than the second biasing force on the plug 2020 when the face valve 2012 is in the open state. Therefore, in some examples, similar to the pilot valve 520 disclosed above, the face valve 2012 can opened by applying a first (higher) electrical power to the solenoid 2014 to initially open the face valve 2012, and then reducing the electrical power to second electrical power to maintain the face valve 2012 in the open position. As shown in the graphs in FIGS. 18A and 18B, the first electrical power is applied over a shorter during than the second electrical power. Therefore, lower energy is required to hold the face valve 2012 in the open state. This reduces power consumption of the solenoid 2014.

Figure 24:
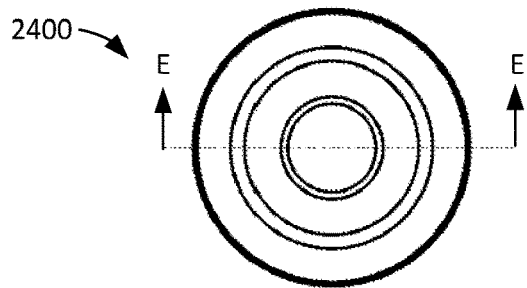
FIG. 24 is a top view of an example piston assembly with an example spool valve that can be implemented in the example height adjustable seat post of FIG. 2.
Figure 25:
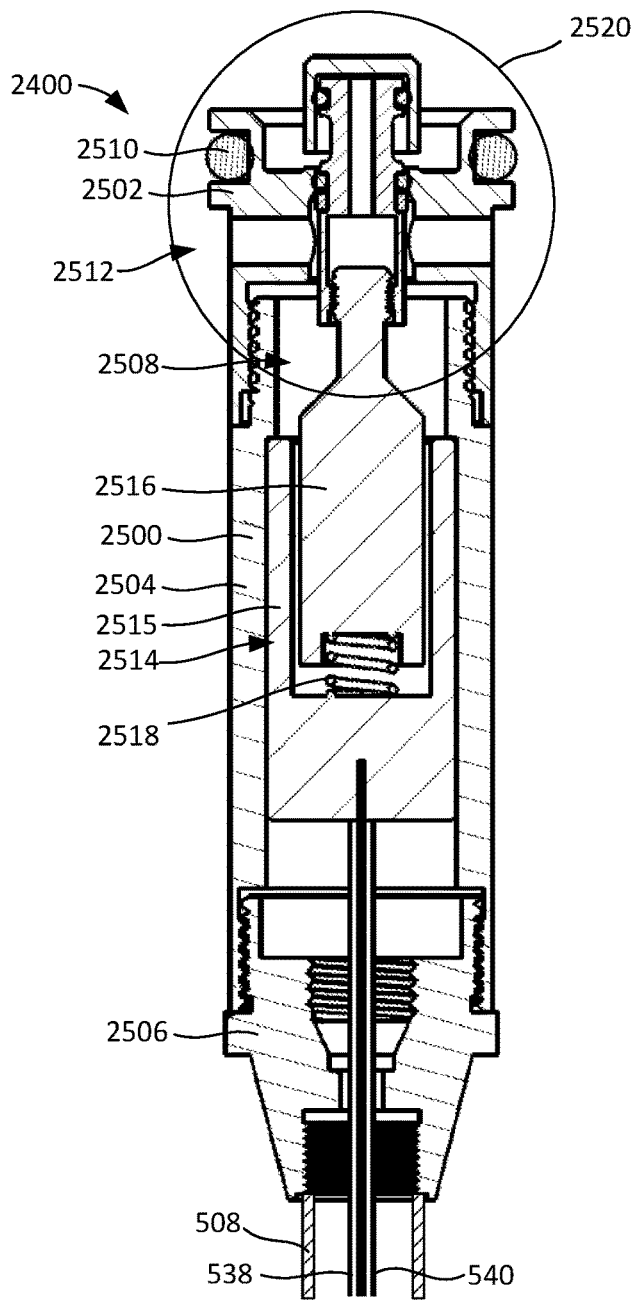
FIG. 25 is a cross-sectional view of the example piston assembly taken along lines E-E of FIG. 24.

FIGS. 24 and 25 illustrate another example piston assembly 2400 that can be implemented in the seat post 200. In this example, the piston assembly 2400 includes an example spool valve, disclosed in further detail herein. FIG. 24 is a top view of the example piston assembly 2400 and FIG. 25 is a cross-sectional view of the example piston assembly 2400 taken along line E-E of FIG. 24.

Referring to FIG. 25, the piston assembly 2400 can be coupled (e.g., threadably coupled) to the shaft 508. 0 In the illustrated example, the piston assembly 2400 includes a piston 2500 formed by a first body 2502, a second body 2504, and a third body 2506. The first and third bodies 2502, 2506 are coupled (e.g., threadably coupled) to opposite ends of the second body 2504. The second body 2504 defines an inner cavity or chamber 2508. The piston assembly 2400 includes a seal 2510 around the first body 2502, which seals against the inner surface 514 (FIG. 5) of the upper tube 204 (FIG. 2). The first body 2502 forms the piston head section of the piston 2500. The seal 2510 separates the first chamber 516 (above the seal 2510) and the second chamber 518 (below the seal 2510).

In the illustrated example of FIG. 25, the piston assembly 2400 includes a spool valve 2512 and a solenoid 2514 to operate the spool valve 2512. The spool valve 2512 is formed at least partially by one or more channels or passages in the piston 2500, as disclosed in further detail herein. In FIG. 25, the spool valve 2512 is in a closed state or position. The solenoid 2514 can be activated to open the spool valve 2512. As shown in FIG. 25, the solenoid 2514 is disposed in the cavity 2508 of the second body 2504. The inner wires 538, 540 are connected to the solenoid 2514, which enable the control module 222 (FIG. 2) to activate or deactivate the solenoid 2514. The solenoid 2514 includes a core with a coil 2515, an armature 2516 (which may also be referred to as a plunger), and a spring 2518 that biases the armature 2516 in the upward direction in FIG. 25. When the solenoid 2514 is activated, the armature 2516 is moved in the downward direction in FIG. 25, as shown in further detail herein.

Figure 26:
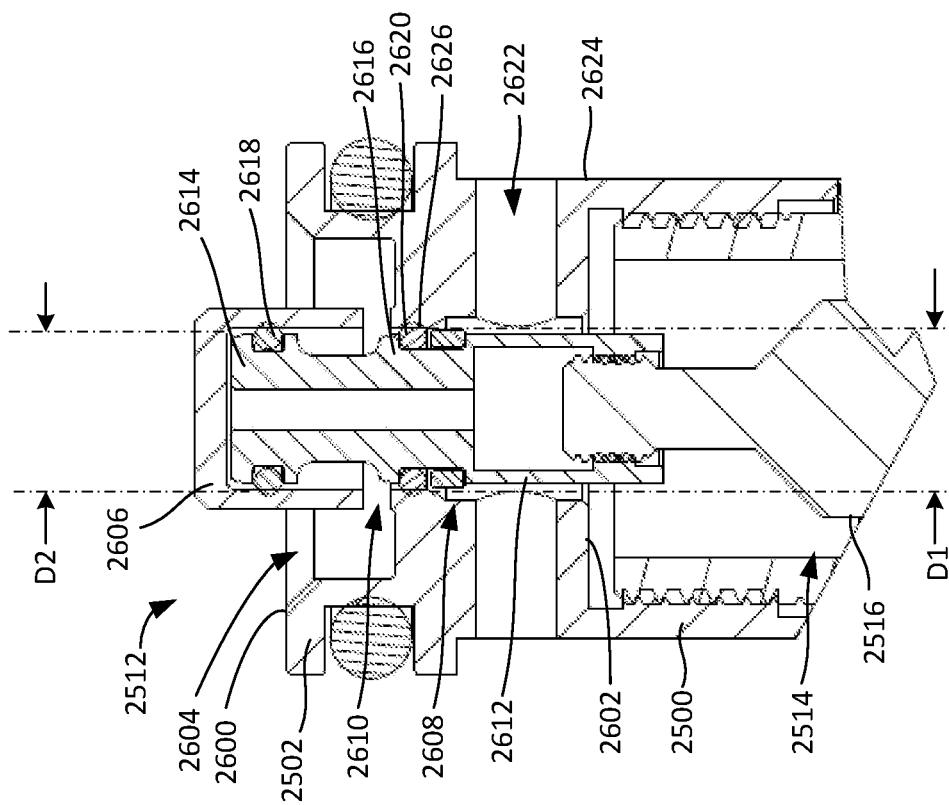
FIG. 26 is an enlarged view of the callout of FIG. 25 showing the spool valve in the closed state.

FIG. 26 is an enlarged view of the callout 2520 of FIG. 25 showing the spool valve 2512 in the closed state. The first body 2502 has a first side 2600 and a second side 2602 opposite the first side 2600. The first side 2600 has a recess 2604. A portion 2606 of the first body 2502 extends upward from the recess 2604. The first body 2502 has a central channel 2608 extending from the second side 2602 and into the portion 2606. The first body 2502 has a first transverse channel 2610 that extends through the portion 2606 and intersects the central channel 2608. The recess 2604, the first transverse channel 2610, and the upper portion of the central channel 2608 are in fluid communication with the fluid in the first chamber 516 (FIG. 10).

As shown in FIG. 26, the spool valve 2512 includes a shuttle 2612 (which may also be referred to as a plug) coupled to the armature 2516. The shuttle 2612 is slidably disposed in the central channel 2608. The shuttle 2612 has a first spool 2614 and a second spool 2616 (sometimes referred to as collars or seals). The first spool 2614 is disposed in the portion 2606 of the first body 2502. The spool valve 2512 includes a first seal 2618 disposed around the first spool 2614 to seal between the first spool 2614 and the portion 2606 of the first body 2502 above the first transverse channel 2610. The spool valve 2512 includes a second seal 2620 around the second spool 2616. As shown in FIG. 26, the first body 2502 has a second transverse channel 2622 that intersects the central channel 2608 and extends to an outer surface 2624 of the piston 2500. As such, the second transverse channel 2622 and a portion of the central channel 2608 (below the second spool 2616) are in fluid communication with the fluid in the second chamber 518 (FIG. 5).

When the solenoid 2514 is not activated, the armature 2516 is biased upward by the spring 2518 (FIG. 25). As such, the second spool 2616 is sealed (via the second seal 2620) against an inner surface 2626 (e.g., a seat) of the central channel 2608 between first transverse channel 2610 and the second transverse channel 2622. This prevents or blocks fluid from flowing between the first transverse channel 2610 and the second transverse channel 2622 and, thus, between the first and second chamber 516, 518. As such, when the spool valve 2512 is in the closed position, the shuttle 2612 blocks communication between the first and second chambers 516, 518 (the positive and negative pressure chambers) to lock the upper tube 204 and the lower tube 202 in position relative to each other.

Figure 27:
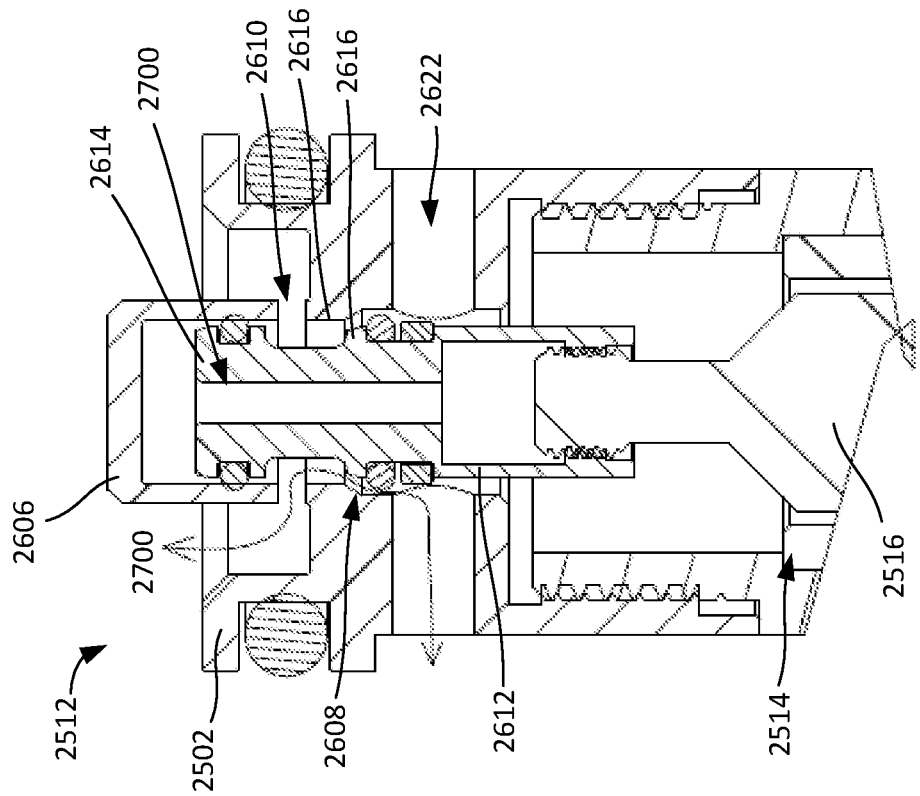
FIG. 27 shows the spool valve of FIG. 26 in an open state.

FIG. 27 shows the spool valve 2512 in an open state or position. When it is desired to open the spool valve 2512, the control module 222 (FIG. 2) activates or turns on the solenoid 2514 by applying a current to the solenoid 2514. The magnetic field generated by the solenoid 2514 causes the plunger 2516 to move downward, which moves the shuttle 2612 downward. As such, the second spool 2616 is not sealed again the inner surface 2626 of the central channel 2608. As shown by the fluid flow line 2700, fluid can flow through the central channel 2608 between the first transverse channel 2610 (which is in fluid communication with the first chamber 516 (FIG. 5)) and the second transverse channel 2622 (which is in fluid communication with the second chamber 518 (FIG. 5)). As such, the spool valve 2512 is open and allows fluid flow between the first and second chambers 516, 518 (the positive and negative pressure chambers). This allows the upper tube 204 (FIG. 2) to move relative to the lower tube 202 (FIG. 2) to adjust the height of the seat 110 (FIG. 1). To close the spool valve 2512, the solenoid 2514 is deactivated, and the spring 2518 (FIG. 25) moves the shuttle 2612 back to the position shown in FIG. 26. As shown in FIG. 27, the shuttle 2612 has a through-hole 2700 to equalize the pressure in the portion 2606 of the first body 2502. This reduces or prevents the volume (between the portion 2606 and the first spool 2614) from generating an unpredictable bias force on the shuttle 2612.

Referring back to FIG. 26, the first seal 2618 and the portion 2606 of the first body 2502 form or define a first seal diameter D1, and the second seal 2620 and the inner surface 2626 of the central channel 2608 form or define a second seal diameter D2. The second deal diameter D2 is the same as or smaller than the first seal diameter D1. This difference creates a biasing force when under fluid or gas pressure that reduces the energy required by the solenoid 2014 to move the plug 2020 and/or hold the plug 2020 in the different states. In some examples, similar to the pilot valve 520 disclosed above, the spool valve 2512 can opened by applying a first (higher) electrical power to the solenoid 2514 to initially open the spool valve 2512, and then reducing the electrical power to a second (lower) electrical power to maintain the spool valve 2512 in the open position. The first electrical power can be applied over a shorter duration than the second electrical power. This reduces power consumption of the solenoid 2514.

Figure 29:
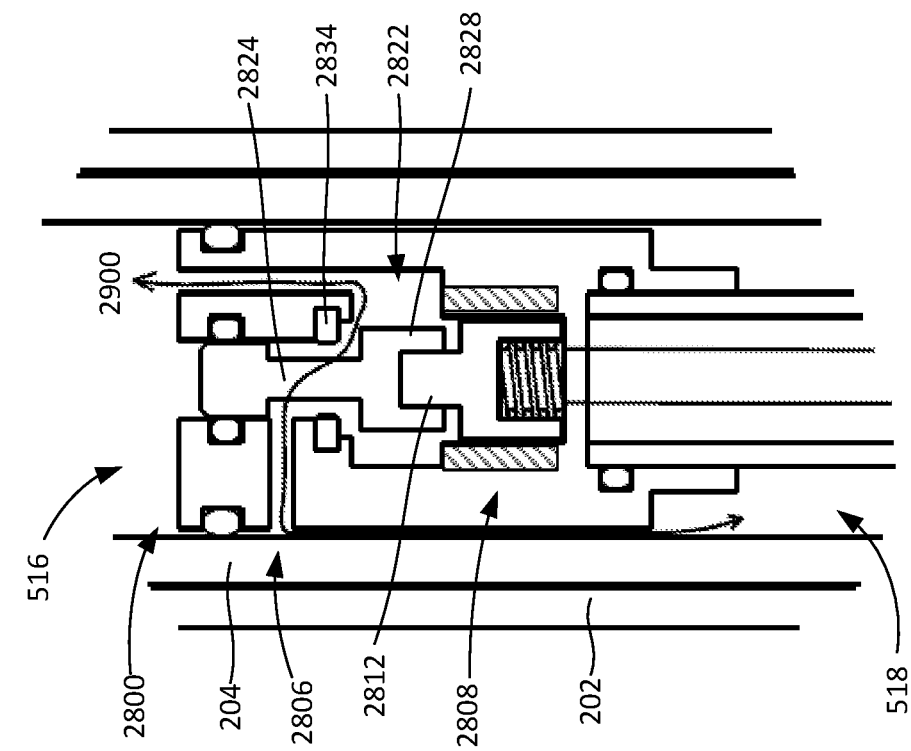
FIG. 29 is the same cross-sectional view as FIG. 28 showing the example pull valve in an open state.
Figure 28:
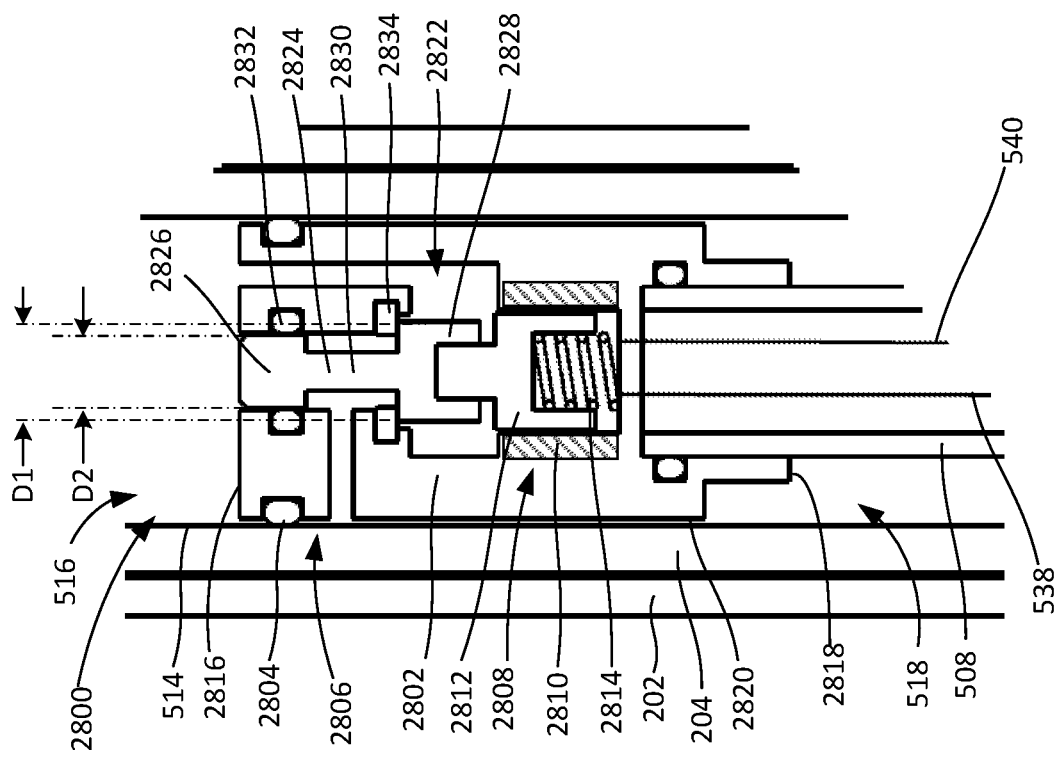
FIG. 28 is a cross-sectional view of an example piston assembly with an example pull valve that can be implemented in the example height adjustable seat post of FIG. 2.

FIGS. 28 and 29 are schematic diagrams of another example piston assembly 2800 that can be implemented in the seat post 200. In this example, the piston assembly 2800 includes an example pull valve, disclosed in further detail herein. FIG. 28 shows the example valve in a closed state or position and FIG. 29 shows the example valve in an open state or position.

Referring to FIG. 28, the piston assembly 2800 is shown in the overlap region between the lower and upper tubes 202, 204. The piston assembly 2800 includes a piston 2802 coupled (e.g., threadably coupled) to the shaft 508. The piston assembly 2800 includes a seal 2804 around the piston 2802, which forms a seal between the piston 2802 and the inner surface 514 of the upper tube 204. The seal 2804 separates the first chamber 516 (above the seal 2804) and the second chamber 518 (below the seal 2804).

In the illustrated example of FIG. 28, the piston assembly 2800 includes a pull valve 2806 and a solenoid 2808 to operate the pull valve 2806. The pull valve 2806 is formed at least partially by one or more channels or passages in the piston 2802, as disclosed in further detail herein. In FIG. 28, the pull valve 2806 is in a closed state or position. The solenoid 2808 can be activated to open the pull valve 2806, as disclosed in further detail herein. As shown in FIG. 28, the solenoid 2808 is disposed in the piston 2802. The inner wires 538, 540 are connected to the solenoid 2808, which enable the control module 222 (FIG. 2) to activate or deactivate the solenoid 2808. The solenoid 2808 includes a core with a coil 2810, an armature 2812 (which may also be referred to as a plunger), and a spring 2814. In this example, the spring 2814 biases the armature 2812 in an upward direction in FIG. 28. When the solenoid 2808 is activated, the armature 2812 is moved in the downward direction in FIG. 28.

In the illustrated example of FIG. 28, the piston 2802 has a first side 2816, a second side 2818 opposite the first side 2816, and an outer side surface 2820. The piston 2802 has a passageway or channel 2822 formed through the piston 2802 between the first side 2816, which is in fluid communication with the first chamber 516, and the outer side surface 2820 below the seal 2804, which is in fluid communication with the second chamber 518.

In the illustrated example, the pull valve 2806 includes a plug 2824 slidably disposed in the passageway 2822 in the piston 2802. The plug 2824 is coupled to the armature 2812 of the solenoid 2808. The plug 2824 a first sealing portion 2826, a second sealing portion 2828, and a shaft portion 2830 between the first and second sealing portions 2826, 2828. The pull valve 2806 includes a first seal 2832 between the first sealing portion 2826 and the piston 2802. The pull valve 2806 also includes a second seal 2834 in the passageway 2822. In FIG. 28, the solenoid 2808 is deactivated. The spring 2814 biases the armature 2812 upward. As such, the second sealing portion 2828 of the plug 2824 is engaged with the second seal 2834. This prevents or blocks fluid from flowing through the passageway 2822 and across the piston 2802 between the first and second chambers 516, 518. As such, when the pull valve 2806 is in the closed state, the pull valve 2806 blocks fluid communication between the first and second chambers 516, 518 (the positive and negative pressure chambers) to lock the upper tube 204 and the lower tube 202 in position relative to each other.

FIG. 29 shows the pull valve 2806 in an open state or position. When it is desired to open the pull valve 2806, the control module 222 (FIG. 2) activates or turns on the solenoid 2808 by applying a current to the solenoid 2808. The magnetic field generated by the solenoid 2808 causes the armature 2812 to move downward, which pulls the plug 2824 downward or away from the second seal 2834. As shown by the fluid flow line 2900, fluid can flow through the passageway 2822 between first chamber 516 and the second chamber 518. This allows the upper tube 204 to move relative to the lower tube 202 to adjust the height of the seat 110 (FIG. 1). To close the pull valve 2806, the solenoid 2808 is deactivated, and the spring 2814 moves the armature 2812 and the plug 2824 back to the position shown in FIG. 28.

Referring back to FIG. 28, the second sealing portion 2828 and the second seal 2834 form or define a first seal diameter D1, and the first sealing portion 2826 and the first seal 2832 form or define a second seal diameter D2. In this example, the second deal diameter D2 is smaller than the first seal diameter D1. This difference creates a biasing force when under fluid or gas pressure that reduces the energy required by the solenoid 2808 to move the plug 2824 and/or hold the plug 2824 in the different states. In other examples, the first and second seal diameters D1, D2 may be the same or the second seal diameter D2 may be larger than the first seal diameter D1. The valve seal diameters can be adjusted to size to optimize valve open, and valve closed states for reduced energy consumption, power requirements, and/or valve actuation speed. In some examples, similar to the pilot valve 520 disclosed above, the pull valve 2806 can opened by applying a first (higher) electrical power to the solenoid 2808 to initially open the pull valve 2806, and then reducing the electrical power to a second (lower) electrical power to maintain the pull valve 2806 in the open position. The first electrical power can be applied over a shorter duration than the second electrical power. This reduces power consumption of the solenoid 2808.

Figures 30, 31:
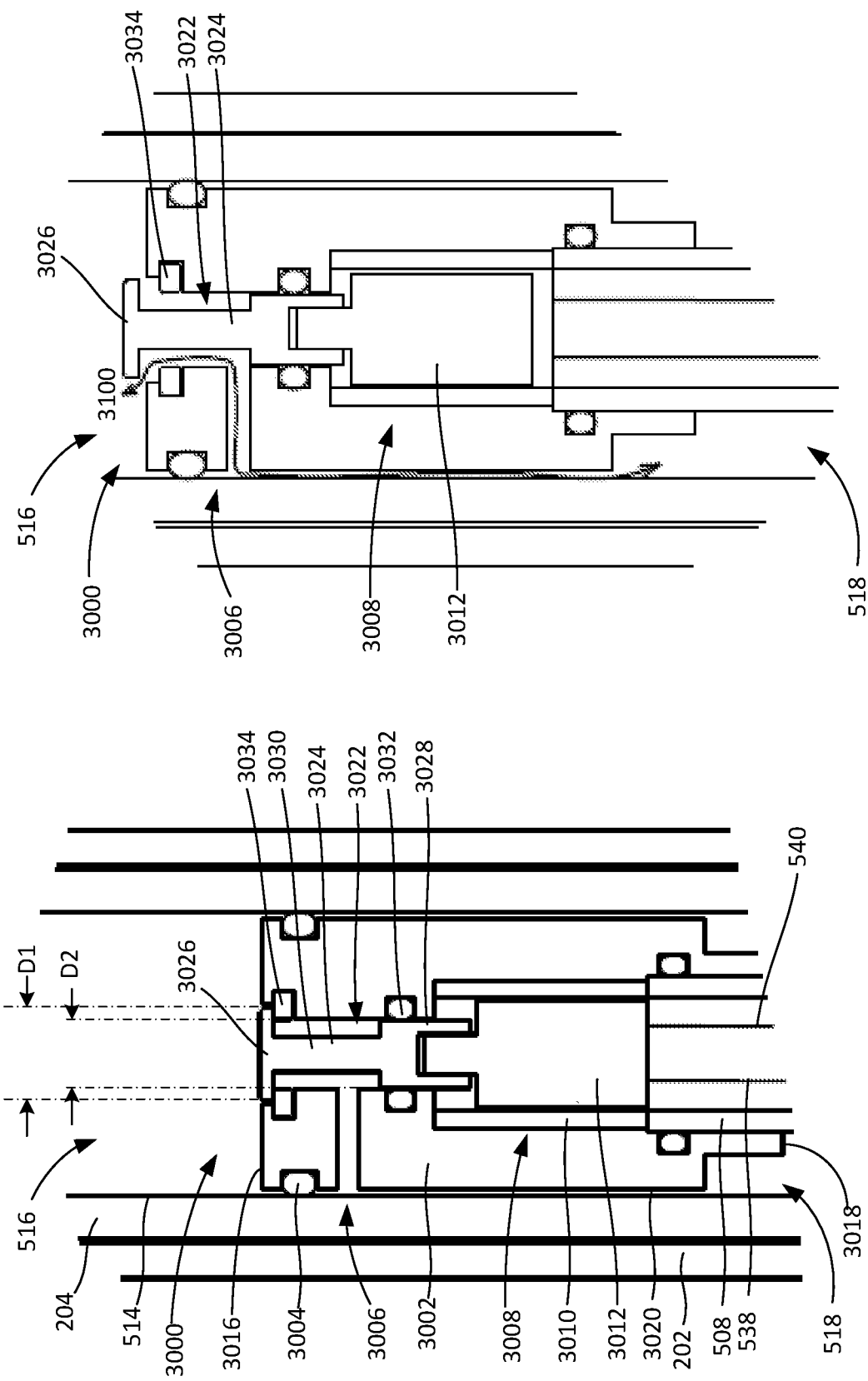
FIG. 30 is a cross-sectional view of an example piston assembly with an example push valve that can be implemented in the example height adjustable seat post of FIG. 2.
FIG. 31 is the same cross-sectional view as FIG. 30 showing the example push valve in an open state.

FIGS. 30 and 31 are schematic diagrams of another example piston assembly 3000 that can be implemented in the seat post 200. In this example, the piston assembly 3000 includes an example push valve, disclosed in further detail herein. FIG. 30 shows the example valve in a closed state or position and FIG. 31 shows the example valve in an open state or position.

Referring to FIG. 30, the piston assembly 3000 is shown in the overlap region between the lower and upper tubes 202, 204. The piston assembly 3000 includes a piston 3002 coupled (e.g., threadably coupled) to the shaft 508. The piston assembly 3000 includes a seal 3004 around the piston 3002, which forms a seal between the piston 3002 and the inner surface 514 of the upper tube 204. The seal 3004 separates the first chamber 516 (above the seal 3004) and the second chamber 518 (below the seal 3004).

In the illustrated example of FIG. 30, the piston assembly 3000 includes a push valve 3006 and a solenoid 3008 to operate the push valve 3006. The push valve 3006 is formed at least partially by one or more channels or passages in the piston 3002, as disclosed in further detail herein. In FIG. 30, the push valve 3006 is in a closed state or position. The solenoid 3008 can be activated to open the push valve 3006. As shown in FIG. 30, the solenoid 3008 is disposed in the piston 3002. The inner wires 538, 540 are connected to the solenoid 3008, which enable the control module 222 (FIG. 2) to activate or deactivate the solenoid 3008. The solenoid 3008 includes a core with coil 3010 and an armature 3012 (which may also be referred to as a plunger). In this example, when the solenoid 3008 is activated, the armature 3012 is moved in the upward (first) direction in FIG. 30 to open the push valve 3006. In this example, the solenoid 3008 does not include a return spring. Instead, when the solenoid 3008 is deactivated, the air pressure differential on the plug 3024 biases the plug 3024 and the armature 3012 in the downward (second) direction. As such, when the solenoid 3008 is deactivated, the plug 3024 is moved downward and the push valve 3006 is closed.

In the illustrated example, the piston 3002 has a first side 3016, a second side 3018 opposite the first side 3016, and an outer side surface 3020. In this example, the piston 3002 has a passageway or channel 3022 formed through the piston 3002 between the first side 3016, which is in fluid communication with the first chamber 516, and the outer side surface 3020 below the seal 3004, which is in fluid communication with the second chamber 518.

In the illustrated example, the push valve 3006 includes a plug 3024 slidably disposed in the piston 3002. The plug 3024 is coupled to the armature 3012 of the solenoid 3008. The plug 3024 has a first sealing portion 3026, a second sealing portion 3028, and a shaft portion 3030 between the first and second sealing portions 3026, 3028. The push valve 3006 includes a first seal 3032 between the second sealing portion 3028 and the piston 3002. The push valve 3006 also includes a second seal 3034 in the passageway 3022. In FIG. 30, the solenoid 3008 is deactivated. The pressure differential across the first sealing portion 3026 biases the plug 3024 downward such that the first sealing portion 3026 remains engaged with the second seal 3034. This prevents or blocks fluid from flowing through the passageway 3022 and across the piston 3002 between the first and second chamber 516, 518. As such, when the push valve 3006 is in the closed position, the push valve 3006 blocks communication between the first and second chambers 516, 518 (the positive and negative pressure chambers) to lock the upper tube 204 and the lower tube 202 in position relative to each other.

FIG. 31 shows the push valve 3006 in an open state or position. When it is desired to open the push valve 3006, the control module 222 (FIG. 2) activates or turns on the solenoid 3008 by applying a current to the solenoid 3008. In this example, the magnetic field generated by the solenoid 3008 causes the armature 3012 to move upward, which pushes the plug 3024 upward and moves the first sealing portion 3026 away from the second seal 3034. As shown by the fluid flow line 3100, fluid can flow through the passageway 3022 between first chamber 516 and the second chamber 518. This allows the upper tube 204 to move relative to the lower tube 202 to adjust the height of the seat 110 (FIG. 1). To close the push valve 3006, the solenoid 3008 is deactivated. As mentioned above, the solenoid 3008 does not include a spring in this example. Instead, when the solenoid 3008 is turned off, the pressure differential on the plug 3024 causes the plug 3024 to move downward to the closed position and remain in the closed position.

Referring back to FIG. 30, the first sealing portion 3026 and the second seal 3034 form or define a first seal diameter D1, and the second sealing portion 3028 and the first seal 3032 form or define a second seal diameter D2. In this example, the second deal diameter D2 is smaller than the first seal diameter D1. This difference creates a biasing force when under fluid or gas pressure that reduces the energy required by the solenoid 3008 to move the plug 3024 and/or hold the plug 3024 in the different states. In other examples, the first and second seal diameters D1, D2 may be the same or the second seal diameter D2 may be larger than the first seal diameter D1. The valve seal diameters can be adjusted to size to optimize valve open, and valve closed states for reduced energy consumption, power requirements, and/or valve actuation speed. In some examples, similar to the pilot valve 520 disclosed above, the push valve 3006 can opened by applying a first (higher) electrical power to the solenoid 3008 to initially open the push valve 3006, and then reducing the electrical power to a second (lower) electrical power to maintain the push valve 3006 in the open position. The first electrical power can be applied over a shorter duration than the second electrical power. This reduces power consumption of the solenoid 3008.

Figure 32:
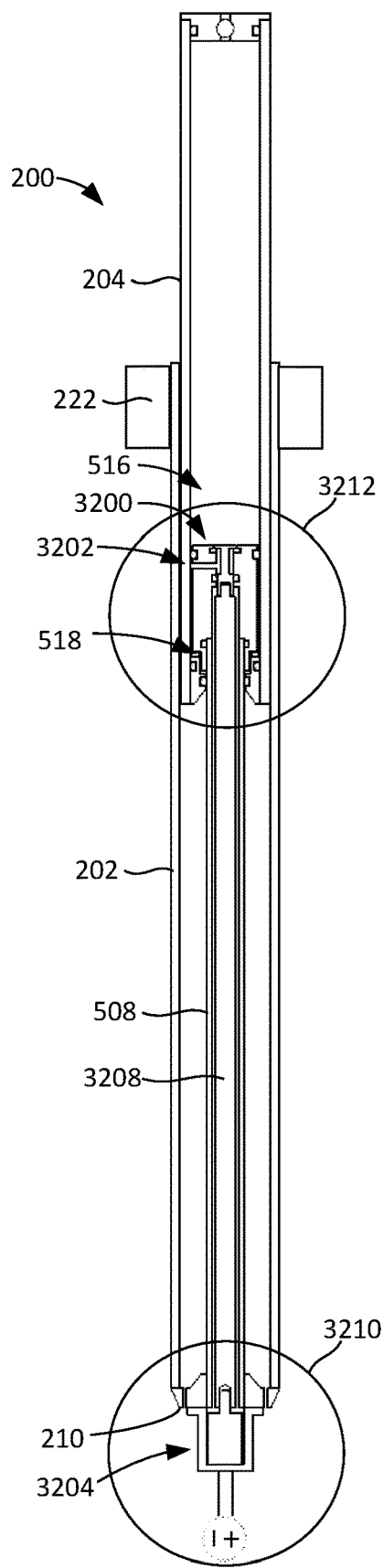
FIG. 32 is a cross-sectional view of the example seat post of FIG. 2 with an example solenoid disposed on a bottom of an example lower tube.
Figure 33:
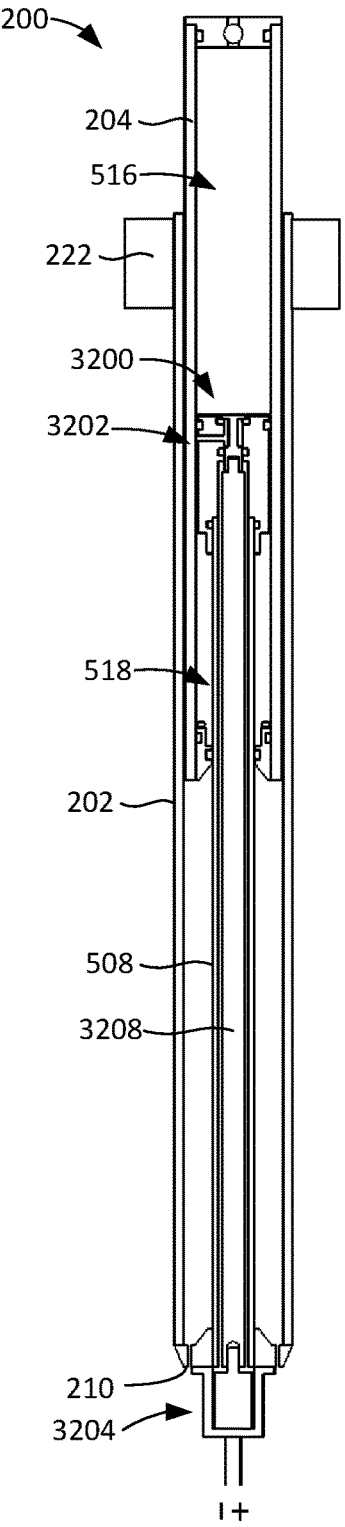
FIG. 33 shows the example seat post of FIG. 32 in a partially contracted position.

FIGS. 32 and 33 illustrate another example valve assembly and solenoid configuration that can be implemented in the seat post 200. FIGS. 32 and 33 are cross-sectional views showing the lower tube 202 and the upper tube 204 of the seat post 200. FIG. 32 shows the seat post 200 in the fully extended position and FIG. 33 shows the seat post 200 in a partially contracted position.

In the illustrated example of FIGS. 32 and 33, the seat post 200 includes a piston assembly 3200 that is coupled to the shaft 508 and disposed the upper tube 204. An example push rod valve 3202 is arranged with the piston assembly and is operable between an open and close state to block or allow fluid flow across the piston assembly 3200 and between the first and second chambers 516, 518. An example of the push rod valve 3202 is shown in further detail in connection with FIGS. 35 and 36.

The push rod valve 3202 is operated by a solenoid 3204. In this example, the solenoid 3204 is coupled to the lower end 210 of the lower tube 202. In some examples, the solenoid 3204 can be disposed in and/or otherwise coupled to the end cap 220. The seat post 200 includes a push rod 3208 slidably disposed in the shaft 508. The push rod 3208 is coupled between the push rod valve 3202 and the solenoid 3204, such that activation of the solenoid 3204 causes the push rod 3208 to move to change the state of the push rod valve 3202. For example, the solenoid 3204 can be activated to move the push rod 3208 to open the push rod valve 3202 in the piston assembly 3200. The push rod 3208 may be any length (e.g., 100 millimeters) depending on the distance between the push rode valve 3202 and the solenoid 3204. The solenoid 3204 is powered by a direct current power supply. In some examples, the solenoid 3204 is powered by the control module 222, which is disposed on outside of the lower tube 202. As disclosed in connection with FIGS. 5 and 6, the seat post 200 can include outer wires 532, 534 (shown in FIGS. 5 and 6), which are routed through the lower tube 202 between the control module 222 and the lower end 210 of the lower tube 202.

Figure 34:
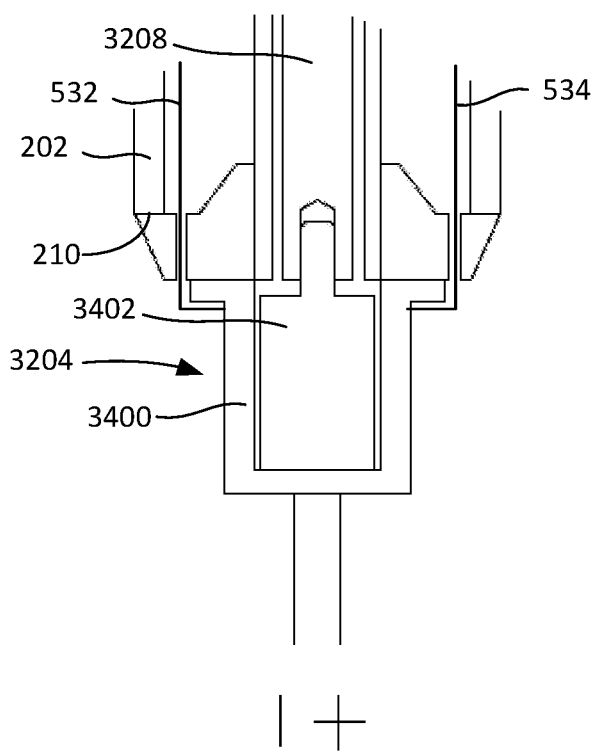
FIG. 34 is an enlarged view of the lower callout of FIG. 32 showing the example solenoid.

FIG. 34 is an enlarged view of the callout 3210 of FIG. 32 showing the solenoid 3204. The solenoid 3204 includes a coil 3400 and an armature 3402 (which may also be referred to as a plunger). The push rod 3208 is coupled to the armature 3402. In this example, when the solenoid 3204 is activated, the magnetic field causes the armature 3402 to move in the upward direction in FIG. 34, which moves the push rod 3208 in the upward direction. In this example, the solenoid 3204 does not include a return spring. Instead, when the solenoid 3204 is deactivated, the pressure differential actuator on the push rod valve 3202 (shown in FIGS.

35 and 36) biases the push rod 3208 downward, thereby moving the armature 3402 back to the downward position shown in FIG. 34. Because the solenoid 3204 is not disposed in the upper tube 204, the seat post 200 does not include inner wires routed up the shaft 508. Instead, the outer wires 532, 534 extend through the lower tube 202 and are electrically coupled directly to the solenoid 3204 on the lower end 210 of the lower tube 202. Further, because the solenoid is not disposed in the upper tube 204, the solenoid 3204 can have a larger diameter. Larger diameter solenoids require less power to produce the same amount of force. As such, this configuration can reduce the power requirements of the solenoid 3204, which can reduce the battery size and power requirements for operating the solenoid 3204.

Figure 35:
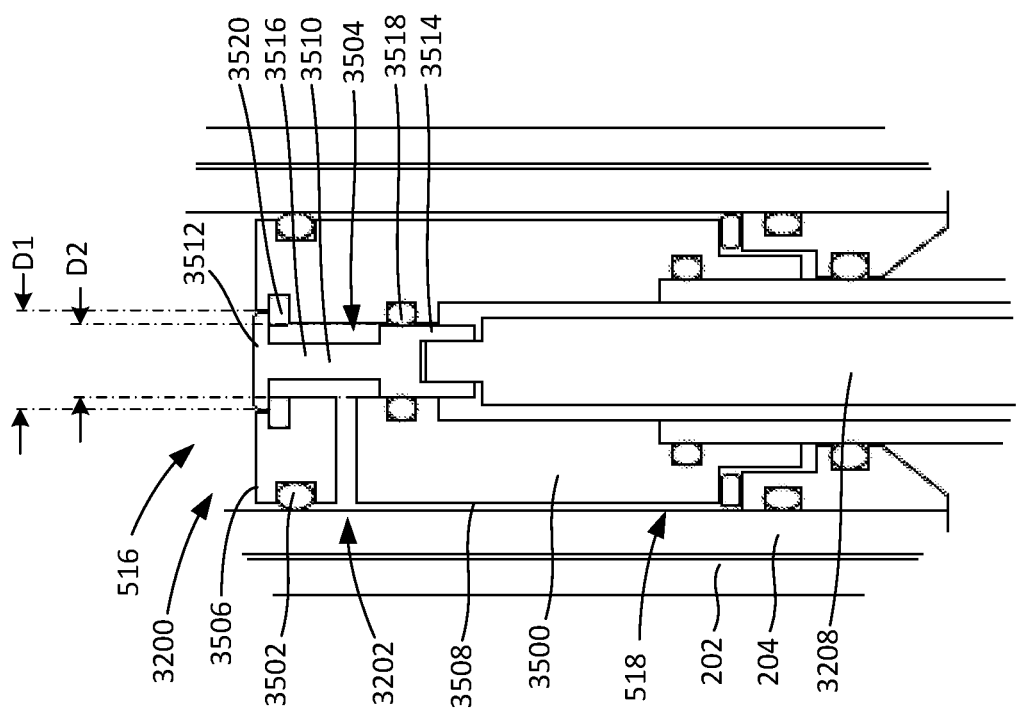
FIG. 35 is an enlarged view of the upper callout of FIG. 32 showing an example piston assembly with an example push rod valve that can be implemented in the example height adjustable seat post.

FIG. 35 is an enlarged view of the callout 3212 of FIG. 32 showing the piston assembly 3200. This piston assembly 3200 includes a piston 3500 and a seal 3502 around the piston 3500. The piston assembly 3200 also includes the push rod valve 3202. The push rod valve 3202 is substantially the same as the push valve 3006 disclosed in connection with FIGS. 30 and 31. As such, any of the example aspects disclosed in connection with the push valve 3006 can likewise apply to the push rod valve 3202.

In the illustrated example, the piston 3500 defines a passageway 3504 between a first side 3506 of the piston 3500 (which is in fluid communication with the first chamber 516) and an outer side surface 3508 of the piston 3500 (which is in fluid communication with the second chamber 518). The push rod valve 3202 includes a plug 3510 coupled to the push rod 3208. The plug 3510 has a first sealing portion 3512, a second sealing portion 3514, and a shaft portion 3516 between the first and second sealing portions 3512, 3514. The push rod valve 3202 includes a first seal 3518 and a second seal 3520. In FIG. 35, the push rod valve 3202 is in the closed state or position and the solenoid 3204 (FIG. 32) is deactivated or turned off. The pressure differential across the first sealing portion 3512 biases the plug 3510 downward such that the first sealing portion 3512 remains engaged with the second seal 3520. This prevents or blocks fluid from flowing through the passageway 3504 and across the piston 3500 between the first and second chambers 516, 518. As such, when the push rod valve 3202 is in the closed position, the push rod valve 3202 blocks communication between the first and second chambers 516, 518 (the positive and negative pressure chambers) to lock the upper tube 204 and the lower tube 202 in position relative to each other.

Figure 36:
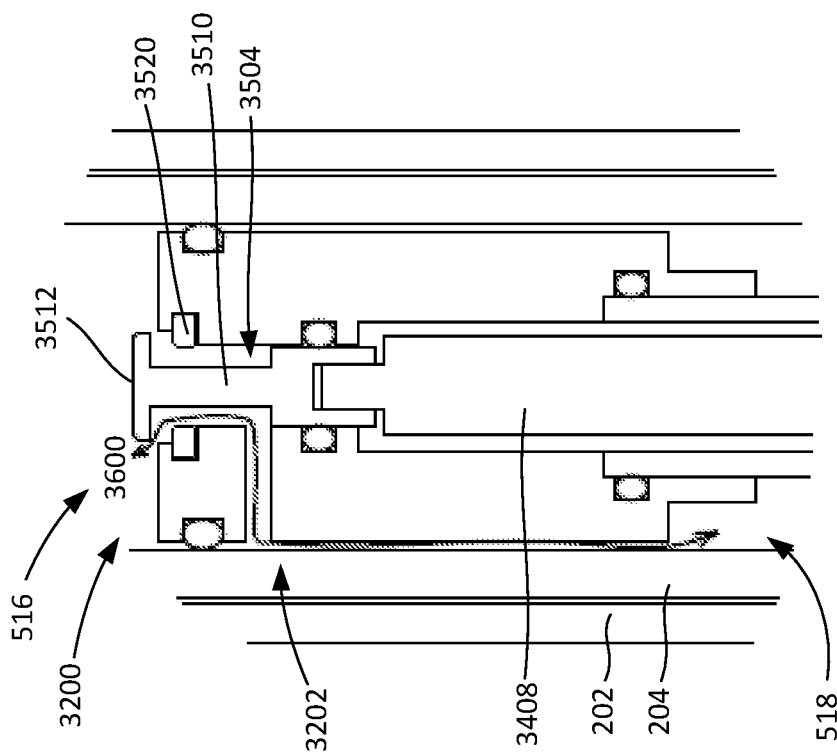
FIG. 36 is the same cross-sectional view as FIG. 35 showing the example push rod valve in an open state.

FIG. 36 shows the push rod valve 3202 in an open state or position. When it is desired to open the push rod valve 3202, the control module 222 (FIG. 32) activates or turns on the solenoid 3204 (FIG. 32) by applying a current to the solenoid 3204. In this example, the magnetic field generated by the solenoid 3204 causes the armature 3402 (FIG. 34) to move upward, which pushes the push rod 3208 and the plug 3510 upward, which moves the first sealing portion 3512 away from the second seal 3520. As shown by the fluid flow line 3600, fluid can flow through the passageway 3504 between first chamber 516 and the second chamber 518. This allows the upper tube 204 to move relative to the lower tube 202 to adjust the height of the seat 110 (FIG. 1). To close the push rod valve 3202, the solenoid 3204 is deactivated. As mentioned above, the solenoid 3204 does not include a spring in this example. Instead, when the solenoid 3204 is turned off, the pressure differential on the plug 3510 causes the plug 3510 to move downward to the closed position and remain in the closed position.

Referring back to FIG. 35, the first sealing portion 3512 and the second seal 3520 form or define a first seal diameter D1, and the second sealing portion 3514 and the first seal 3518 form or define a second seal diameter D2. In this example, the second deal diameter D2 is smaller than the first seal diameter D1. This difference creates a biasing force when under fluid or gas pressure that reduces the energy required by the solenoid 3204 to move the plug 3510 and/or hold the plug 3510 in the different states. In other examples, the first and second seal diameters D1, D2 may be the same or the second seal diameter D2 may be larger than the first seal diameter D1. The valve seal diameters can be adjusted to size to optimize valve open and valve closed states for reduced energy consumption, power requirements, and/or valve actuation speed. In some examples, similar to the pilot valve 520 disclosed above, the push rod valve 3202 can opened by applying a first (higher) electrical power to the solenoid 3204 to initially open the push rod valve 3202, and then reducing the electrical power to a second (lower) electrical power to maintain the push rod valve 3202 in the open position. The first electrical power can be applied over a shorter duration than the second electrical power. This reduces power consumption of the solenoid 3204.

As can be appreciated, the example solenoid-operated valves disclosed herein do not require transmissions or position encoders as seen in known dropper seat posts actuation systems. As such, the examples disclosed herein reduce complexity and costs. While the example valves and solenoids disclosed herein are described in connection with seat posts having a pneumatic platform, the examples disclosed herein can also be used in connection with hydraulic platforms. For example, instead of having pneumatic chambers filled with pressurized gas, the chambers can be filled with a hydraulic fluid, such as oil. Also, while the examples disclosed herein utilize a battery in the control module as the power supply to activate the solenoid, in other examples, the solenoid can be activated from another power supply, such as an electric bicycle battery or from another battery attached to the bicycle.

Example systems, apparatus, and articles of manufacture for bicycles (and/or other vehicles) are disclosed herein. Examples and combinations of examples disclosed herein include the following:

Example 1 is a height adjustable seat post for a bicycle. The height adjustable seat post comprises an upper tube and a lower tube configured in a telescopic arrangement. A lower end of the lower tube is configured to be coupled to a frame of the bicycle, and the upper tube is to be coupled to a seat. The height adjustable seat post includes a shaft coupled to the lower tube and extending into the upper tube and a piston assembly coupled to the shaft and disposed in the upper tube. The piston assembly includes a piston dividing the upper tube into a first chamber and a second chamber. The first and second chambers are filled with fluid. A valve is operable between a closed state in which the fluid is blocked from flowing between the first and second chambers and an open state to enable the fluid to flow between the first and second chambers. The height adjustable seat post also includes a solenoid to control the valve.

Example 2 includes the height adjustable seat post of Example 1, wherein the fluid is pressurized gas.

Example 3 includes the height adjustable seat post of Examples 1 and 2, wherein the solenoid is in the piston.

Example 4 includes the height adjustable seat post of any of Examples 1-3, wherein the solenoid is disposed in a region of overlap between the upper tube and the lower tube.

Example 5 includes the height adjustable seat post of Examples 1 or 2, wherein the solenoid is coupled to a lower end of the lower tube.

Example 6 includes the height adjustable seat post of Example 5, further including a push rod slidably disposed in the shaft. The push rod is coupled between the valve and the solenoid, such that activation of the solenoid causes the push rod to change the state of the valve.

Example 7 includes the height adjustable seat post of Examples 5 and 7, further including a control module to activate the solenoid. The control module is coupled to an outer surface of the lower tube at or near an upper end of the lower tube. Outer wires are disposed in the lower tube. The outer wires are electrically coupled to the control module. The outer electrical wires extend through the lower tube to the solenoid.

Example 8 includes the height adjustable seat post of any of Examples 1-7, wherein the solenoid includes an armature, and wherein, when the solenoid is activated, the armature is moved in a first direction to open the valve, and when the solenoid is deactivated, the armature is moved in a second direction to close the valve.

Example 9 includes the height adjustable seat post of Example 8, wherein the solenoid includes a spring to bias the armature in the second direction.

Example 10 includes the height adjustable seat post of Examples 8 or 9, wherein the valve includes a plug coupled to the armature, and wherein the plug and the armature are biased in the second direction via an air pressure differential on the plug.

Example 11 includes the height adjustable seat post of Example 10, wherein a first biasing force on the plug when the valve is in the closed state is greater than a second biasing force on the plug when the valve is in the open state.

Example 12 includes the height adjustable seat post of Example 3, further including an end cap coupled to the lower end of the lower tube. Inner wires are disposed in the shaft and extend between the end cap and the solenoid. One or more electrical connectors in the end cap to electrically couple the inner wires to a control module to activate the solenoid.

Example 13 include the height adjustable seat post of Example 12, further including outer wires in the lower tube. The outer wires are electrically coupled to the control module. The outer wires extend through the lower tube to the end cap. The control module is coupled to an outer surface of the lower tube at or near an upper end of the lower tube. The one or more electrical connectors electrically couple the inner wires and the outer wires such that an electrical path is formed between the control module and the solenoid.

Example 14 is a height adjustable seat post for a bicycle. The height adjustable seat post comprises an upper tube and a lower tube configured in a telescopic arrangement. The lower tube is to be coupled to a frame of the bicycle, and the upper tube to be coupled to a seat. The height adjustable seat post includes an end cap coupled to a lower end of the lower tube, a shaft coupled to the lower tube and extending into the upper tube, and a piston assembly coupled to the shaft and disposed in the upper tube. The piston assembly divides the upper tube into a first chamber and a second chamber. The piston assembly includes a solenoid. The height adjustable seat post includes a control module to activate the solenoid. Inner wires are disposed in the shaft and extend between the end cap and the solenoid. One or more electrical connectors in the end cap electrically couple the inner wires to the control module.

Example 15 includes the height adjustable seat post of Example 14, further including outer wires in the lower tube. The outer wires are electrically coupled to the control module. The outer wires extend through the lower tube to the end cap. The height adjustable seat post also includes inner wires in the shaft and extending between the end cap and the solenoid, and one or more electrical connectors in the end cap to electrically couple the outer wires and the inner wires such that an electrical path is formed between the control module and the solenoid.

Example 16 includes the height adjustable seat post of any of Examples 14-15, wherein the control module is coupled to the lower tube at or near an upper end of the lower tube.

Example 17 includes the height adjustable seat post of any of Examples 14-16, wherein the control module includes a collar coupled to the lower tube and a power supply coupled to the collar such that the power supply is fixed relative to the lower tube. The power supply to supply power to energize the solenoid.

Example 18 includes the height adjustable seat post of any of Examples 11-17, wherein the solenoid is disposed in a region of overlap between the upper tube and the lower tube.

Example 19 includes the height adjustable seat post of any of Examples 14-18, wherein the first and second chambers are filled with pressurized gas.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A height adjustable seat post for a bicycle, the height adjustable seat post comprising:
   an upper tube and a lower tube configured in a telescopic arrangement, a lower end of the lower tube to be coupled to a frame of the bicycle, the upper tube to be coupled to a seat;
   a shaft coupled to the lower tube and extending into the upper tube;
   a piston assembly coupled to the shaft and disposed in the upper tube, the piston assembly including a piston dividing the upper tube into a first chamber and a second chamber, the first and second chambers filled with fluid;
   a valve operable between a closed state in which the fluid is blocked from flowing between the first and second chambers and an open state to enable the fluid to flow between the first and second chambers; and
   a solenoid to control the valve.

2. The height adjustable seat post of claim 1, wherein the fluid is pressurized gas.

3. The height adjustable seat post of claim 1, wherein the solenoid is in the piston.

4. The height adjustable seat post of claim 1, wherein the solenoid is disposed in a region of overlap between the upper tube and the lower tube.

5. The height adjustable seat post of claim 1, wherein the solenoid is coupled to a lower end of the lower tube.

6. The height adjustable seat post of claim 5, further including a push rod slidably disposed in the shaft, the push rod coupled between the valve and the solenoid such that activation of the solenoid causes the push rod to change the state of the valve.

7. The height adjustable seat post of claim 5, further comprising:
   a control module to activate the solenoid, the control module coupled to an outer surface of the lower tube at or near an upper end of the lower tube; and
   outer electrical wires disposed in the lower tube, the electrical wires electrically coupled to the control module, the outer electrical wires extending through the lower tube to the solenoid.

8. The height adjustable seat post of claim 1, wherein the solenoid includes an armature, wherein, when the solenoid is activated, the armature is moved in a first direction to open the valve, and when the solenoid is deactivated, the armature is moved in a second direction to close the valve.

9. The height adjustable seat post of claim 8, wherein the solenoid includes a spring to bias the armature in the second direction.

10. The height adjustable seat post of claim 8, wherein the valve includes a plug coupled to the armature, and wherein the plug and the armature are biased in the second direction via an air pressure differential on the plug.

11. The height adjustable seat post of claim 10, wherein a first biasing force on the plug when the valve is in the closed state is greater than a second biasing force on the plug when the valve is in the open state.

12. The height adjustable seat post of claim 3, further including:
   an end cap coupled to the lower end of the lower tube;
   inner wires disposed in the shaft and extending between the end cap and the solenoid; and
   one or more electrical connectors in the end cap to electrically couple the inner wires to a control module to activate the solenoid.

13. The height adjustable seat post of claim 12, further including outer wires in the lower tube, the outer wires electrically coupled to the control module, the outer wires extending through the lower tube to the end cap, the control module coupled to an outer surface of the lower tube at or near an upper end of the lower tube, the one or more electrical connectors electrically couple the inner wires and the outer wires such that an electrical path is formed between the control module and the solenoid.

14. A height adjustable seat post for a bicycle, the height adjustable seat post comprising:
   an upper tube and a lower tube configured in a telescopic arrangement, the lower tube to be coupled to a frame of the bicycle, the upper tube to be coupled to a seat;
   an end cap coupled to a lower end of the lower tube;
   a shaft coupled to the lower tube and extending into the upper tube;
   a piston assembly coupled to the shaft and disposed in the upper tube, the piston assembly dividing the upper tube into a first chamber and a second chamber, the piston assembly including a solenoid;
   a control module to activate the solenoid;
   inner wires disposed in the shaft and extending between the end cap and the solenoid; and
   one or more electrical connectors in the end cap to electrically couple the inner wires to the control module.

15. The height adjustable seat post of claim 14, further including outer wires disposed in the lower tube, the outer wires electrically coupled to the control module, the outer wires extending through the lower tube to the end cap, the control module coupled to an outer surface of the lower tube, the one or more electrical connectors in the end cap to electrically couple the outer wires and the inner wires such that an electrical path is formed between the control module and the solenoid.

16. The height adjustable seat post of claim 15, wherein the control module is coupled to the lower tube at or near an upper end of the lower tube.

17. The height adjustable seat post of claim 16, wherein the control module includes a collar coupled to the lower tube and a power supply coupled to the collar such that the power supply is fixed relative to the lower tube, the power supply to supply power to energize the solenoid.

18. The height adjustable seat post of claim 14, wherein the solenoid is disposed in a region of overlap between the upper tube and the lower tube.

19. The height adjustable seat post of claim 14, wherein the first and second chambers are filled with pressurized gas.

* * * * *